(12) United States Patent
Chen et al.

(10) Patent No.: US 12,066,578 B2
(45) Date of Patent: Aug. 20, 2024

(54) CALIBRATION AND LOCALIZATION OF A LIGHT DETECTION AND RANGING (LIDAR) DEVICE USING A PREVIOUSLY CALIBRATED AND LOCALIZED LIDAR DEVICE

(71) Applicant: Waymo LLC, Mountain View, CA (US)

(72) Inventors: Mingcheng Chen, Sunnyvale, CA (US); Colin Braley, Mountain View, CA (US); Volker Grabe, Redwood City, CA (US); Christian Lauterbach, Campbell, CA (US)

(73) Assignee: Waymo LLC, Mountain View, CA (US)

( * ) Notice: Subject to any disclaimer, the term of this patent is extended or adjusted under 35 U.S.C. 154(b) by 863 days.

(21) Appl. No.: 17/173,242

(22) Filed: Feb. 11, 2021

(65) Prior Publication Data

US 2022/0244395 A1    Aug. 4, 2022

Related U.S. Application Data

(60) Provisional application No. 62/984,374, filed on Mar. 3, 2020.

(51) Int. Cl.
    *G01S 7/48*     (2006.01)
    *G01S 7/497*    (2006.01)
    (Continued)

(52) U.S. Cl.
    CPC .......... *G01S 7/4972* (2013.01); *G01S 7/497* (2013.01); *G01S 17/10* (2013.01); *G01S 17/42* (2013.01);
    (Continued)

(58) Field of Classification Search
    None
    See application file for complete search history.

(56) References Cited

U.S. PATENT DOCUMENTS

| | | |
|---|---|---|
| 2017/0124781 A1 | 5/2017 | Douillard et al. |
| 2018/0087907 A1 | 3/2018 | DeBitetto et al. |
| 2019/0056484 A1 | 2/2019 | Bradley et al. |

FOREIGN PATENT DOCUMENTS

| | | |
|---|---|---|
| KR | 10-2018-0106417 A | 10/2018 |
| WO | 2013/045927 A1 | 4/2013 |

OTHER PUBLICATIONS

International Search Report and Written Opinion for PCT/US2021/019220 dated Jun. 11, 2021; 8 pages.

*Primary Examiner* — Hovhannes Baghdasaryan
(74) *Attorney, Agent, or Firm* — McDonnell Boehnen Hulbert & Berghoff LLP

(57) ABSTRACT

Example embodiments relate to calibration and localization of a light detection and ranging (lidar) device using a previously calibrated and localized lidar device. An example embodiment includes a method. The method includes receiving, by a computing device associated with a second vehicle, a first point cloud captured by a first lidar device of a first vehicle. The first point cloud includes points representing the second vehicle. The method also includes receiving, by the computing device, pose information indicative of a pose of the first vehicle. In addition, the method includes capturing, using a second lidar device of the second vehicle, a second point cloud. Further, the method includes receiving, by the computing device, a third point cloud representing the first vehicle. Yet further, the method includes calibrating and localizing, by the computing device, the second lidar device.

20 Claims, 12 Drawing Sheets

(51) Int. Cl.
   *G01S 17/10* (2020.01)
   *G01S 17/42* (2006.01)
   *G01S 17/86* (2020.01)
   *G01S 17/87* (2020.01)
   *G01S 17/931* (2020.01)
(52) U.S. Cl.
   CPC .............. *G01S 17/86* (2020.01); *G01S 17/87* (2013.01); *G01S 17/931* (2020.01)

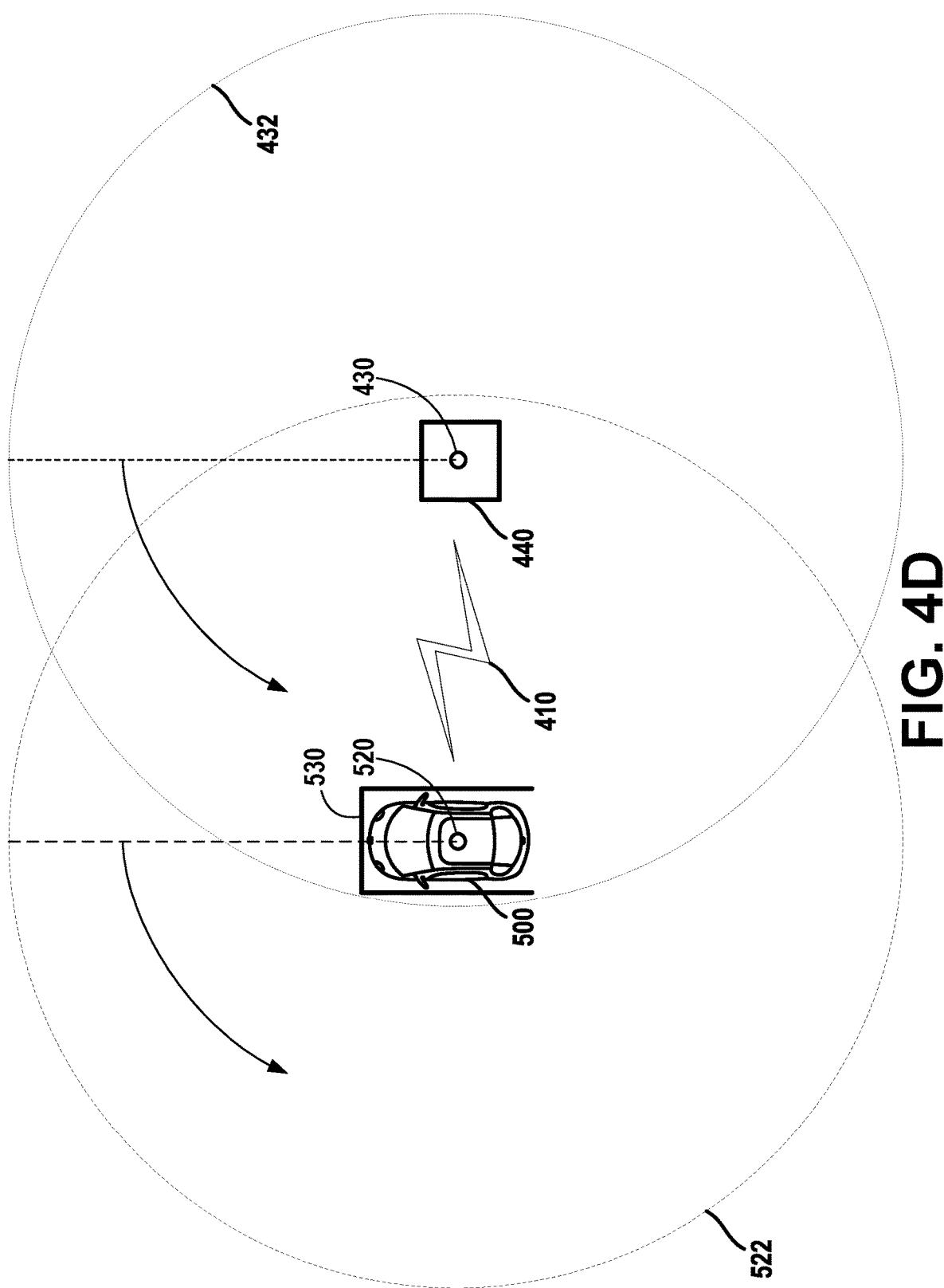

CALIBRATION AND LOCALIZATION OF A LIGHT DETECTION AND RANGING (LIDAR) DEVICE USING A PREVIOUSLY CALIBRATED AND LOCALIZED LIDAR DEVICE

CROSS-REFERENCE TO RELATED APPLICATIONS

The present application claims priority to Provisional Patent Application No. 62/984,374, filed with the U.S. Patent and Trademark Office on Mar. 3, 2020, the contents of which are hereby incorporated by reference.

BACKGROUND

Unless otherwise indicated herein, the materials described in this section are not prior art to the claims in this application and are not admitted to be prior art by inclusion in this section.

Light detection and ranging (lidar) devices may estimate distances to objects in a given environment. For example, an emitter subsystem of a lidar device may emit near-infrared light pulses, which may interact with objects in the device's environment. At least a portion of the light pulses may be redirected back toward the lidar (e.g., due to reflection or scattering) and detected by a detector subsystem. Conventional detector subsystems may include a plurality of detectors and a corresponding controller configured to determine an arrival time of the respective light pulses with high temporal resolution (e.g., ~400 ps). The distance between the lidar device and a given object may be determined based on a time of flight of the corresponding light pulses that interact with the given object.

Autonomous vehicles or vehicles operating in an autonomous mode may use various sensors to detect their surroundings. For example, lidar devices, radio detection and ranging (radar) devices, and/or cameras may be used to identify objects in environments surrounding autonomous vehicles. Such sensors may be used in object detection and avoidance and/or in navigation, for example. However, accurate detection of objects in the surroundings of the vehicle may be dependent upon accurate calibration and/or localization of the respective sensors.

SUMMARY

The disclosure relates to calibration and localization of a lidar device using a previously calibrated and localized lidar device. An example calibration and localization technique may include an interaction between a first vehicle with an associated lidar device and a second vehicle with an associated lidar device. The first vehicle/lidar device may be sufficiently well-calibrated and well-localized, such that its localization and calibration can be relied upon to calibrate the second vehicle/lidar device. For example, when the two vehicles/lidar devices are positioned in proximity to one another, the first lidar device may capture a point cloud of its surrounding environment and the second lidar device may capture a separate point cloud of its surrounding environment. Then, based on the two captured point clouds, a description of the three-dimensional shape of one or more portions of the second vehicle, and the calibration and localization of the first vehicle/lidar device, a calibration and localization can be determined for the second vehicle.

In one aspect, a method is provided. The method includes receiving, by a computing device associated with a second vehicle, a first point cloud captured by a first light detection and ranging (lidar) device of a first vehicle. The first point cloud includes points representing the second vehicle. The method also includes receiving, by the computing device, pose information indicative of a pose of the first vehicle. Further, the method includes determining, by the computing device, that a confidence level of accurate calibration of the first lidar device exceeds a calibration confidence threshold and a confidence level of accurate localization of the first lidar device exceeds a localization confidence threshold. In addition, the method includes capturing, using a second lidar device of the second vehicle while the second vehicle remains stationary, a second point cloud. Still further, the method includes receiving, by the computing device, a first localization transform associated with the first vehicle and a first calibration transform associated with the first vehicle. The first localization transform is usable to transform between a coordinate system of the first vehicle and a world coordinate system. Yet further, the method includes receiving, by the computing device, a third point cloud representing the first vehicle. Even further, the method includes calibrating and localizing, by the computing device, the second lidar device based on the first point cloud, the pose information, the second point cloud, the first localization transform, the first calibration transform, and the third point cloud.

In another aspect, a method is provided. The method includes capturing, using a first light detection and ranging (lidar) device of a first vehicle, a first point cloud. The first point cloud includes points representing a second vehicle. The method also includes determining, by a computing device associated with the first vehicle, pose information indicative of a pose of the first vehicle. Further, the method includes determining, by the computing device, that a confidence level of accurate calibration of the first lidar device exceeds a calibration confidence threshold and a confidence level of accurate localization of the first lidar device exceeds a localization confidence threshold. In addition, the method includes receiving, by the computing device, a second point cloud. The second point cloud is captured by a second lidar device of the second vehicle while the second vehicle remains stationary. Still further, the method includes determining, by the computing device, a first localization transform associated with the first vehicle and a first calibration transform associated with the first vehicle. The first localization transform is usable to transform between a coordinate system of the first vehicle and a world coordinate system. Yet further, the method includes determining, by the computing device, a third point cloud representing the first vehicle. Even still further, the method includes calibrating and localizing, by the computing device, the second lidar device based on the first point cloud, the pose information, the second point cloud, the first localization transform, the first calibration transform, and the third point cloud.

In an additional aspect, a method is provided. The method includes receiving, by a computing device, a first point cloud captured by a first light detection and ranging (lidar) device of a first vehicle. The first point cloud includes points representing a second vehicle. The computing device is located remotely from the first vehicle and the second vehicle. The method also includes receiving, by the computing device, pose information indicative of a pose of the first vehicle. Further, the method includes determining, by the computing device, that a confidence level of accurate calibration of the first lidar device exceeds a calibration confidence level and a confidence level of accurate localization of the first lidar device exceeds a localization confidence threshold. In addition, the method includes receiving, by the computing device, a second point cloud. The second point cloud is captured by a second lidar device of the second vehicle while the second vehicle remains stationary. Still further, the method includes receiving, by the computing device, a first localization transform associated with the first vehicle and a first calibration transform associated with the first vehicle. The first localization transform is usable to transform between a coordinate system of the first vehicle and a world coordinate system. Even further, the method includes receiving, by the computing device, a third point cloud representing the first vehicle. Yet further, the method includes calibrating and localizing, by the computing device, the second lidar device based on the first point cloud, the pose information, the second point cloud, the first localization transform, the first calibration transform, and the third point cloud.

These as well as other aspects, advantages, and alternatives will become apparent to those of ordinary skill in the art by reading the following detailed description, with reference, where appropriate, to the accompanying drawings.

BRIEF DESCRIPTION OF THE DRAWINGS

FIG. 4D is an illustration of an arrangement of lidar devices used to calibrate and localize at least one of the lidar devices, according to example embodiments.

DETAILED DESCRIPTION

Figure 1:
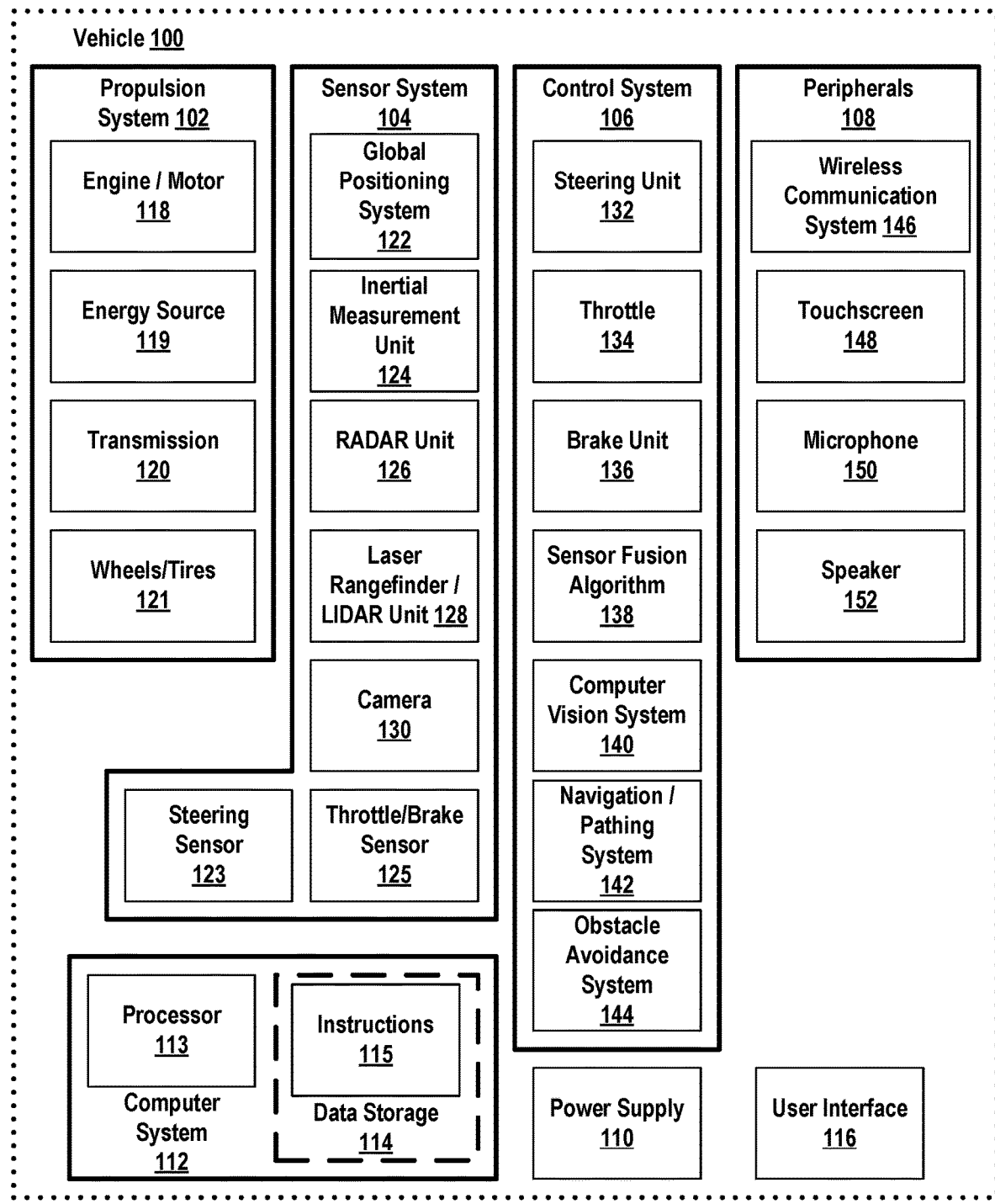
FIG. 1 is a functional block diagram illustrating a vehicle, according to example embodiments.
Figure 2A:
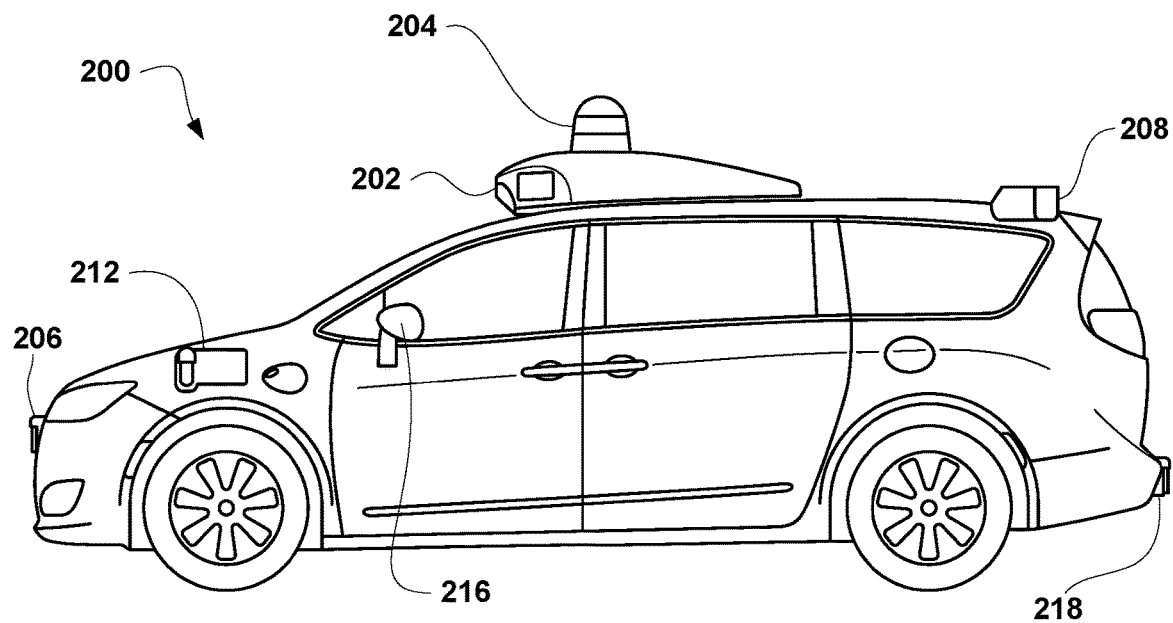
FIG. 2A is an illustration of a physical configuration of a vehicle, according to example embodiments.
Figure 2B:
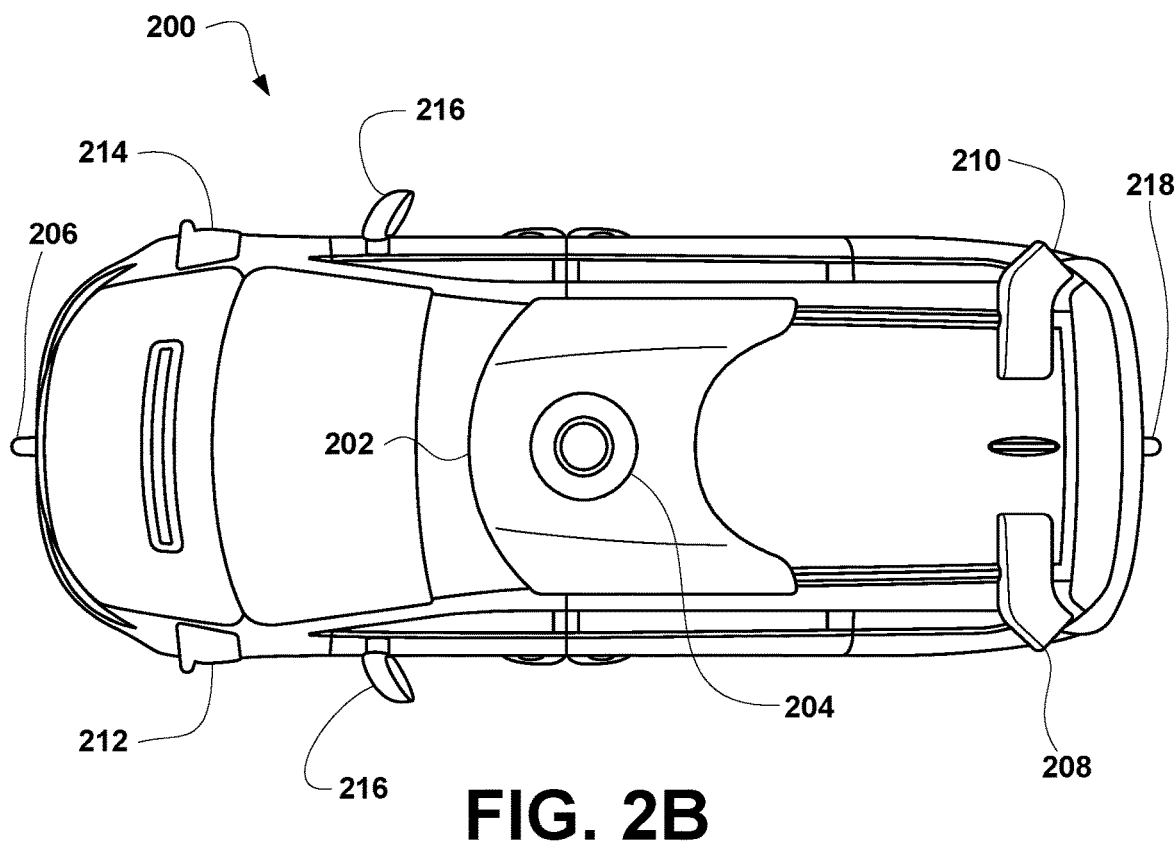
FIG. 2B is an illustration of a physical configuration of a vehicle, according to example embodiments.
Figure 2C:
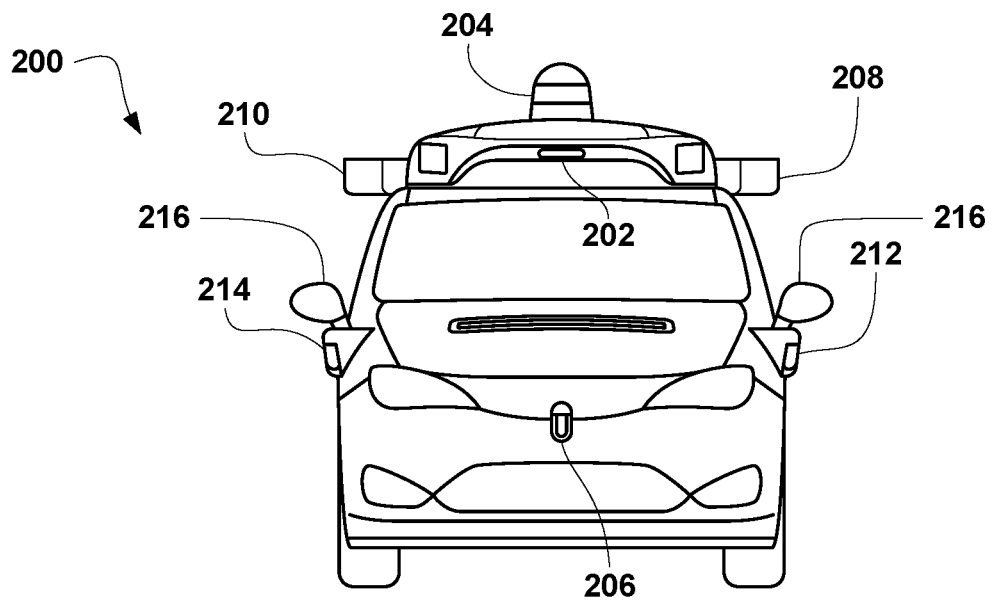
FIG. 2C is an illustration of a physical configuration of a vehicle, according to example embodiments.
Figure 2D:
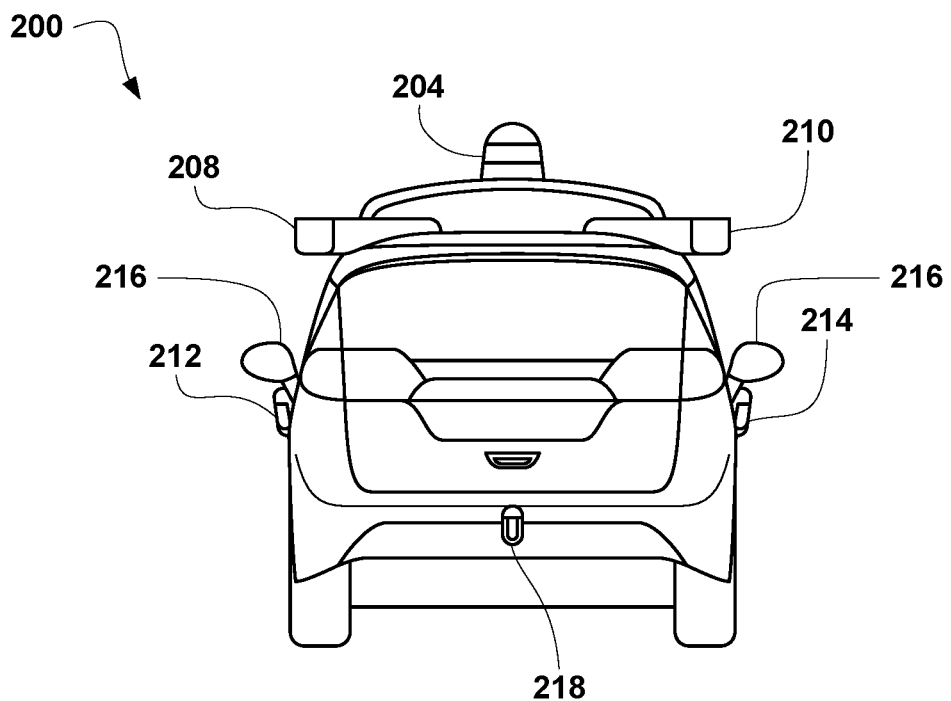
FIG. 2D is an illustration of a physical configuration of a vehicle, according to example embodiments.
Figure 2E:
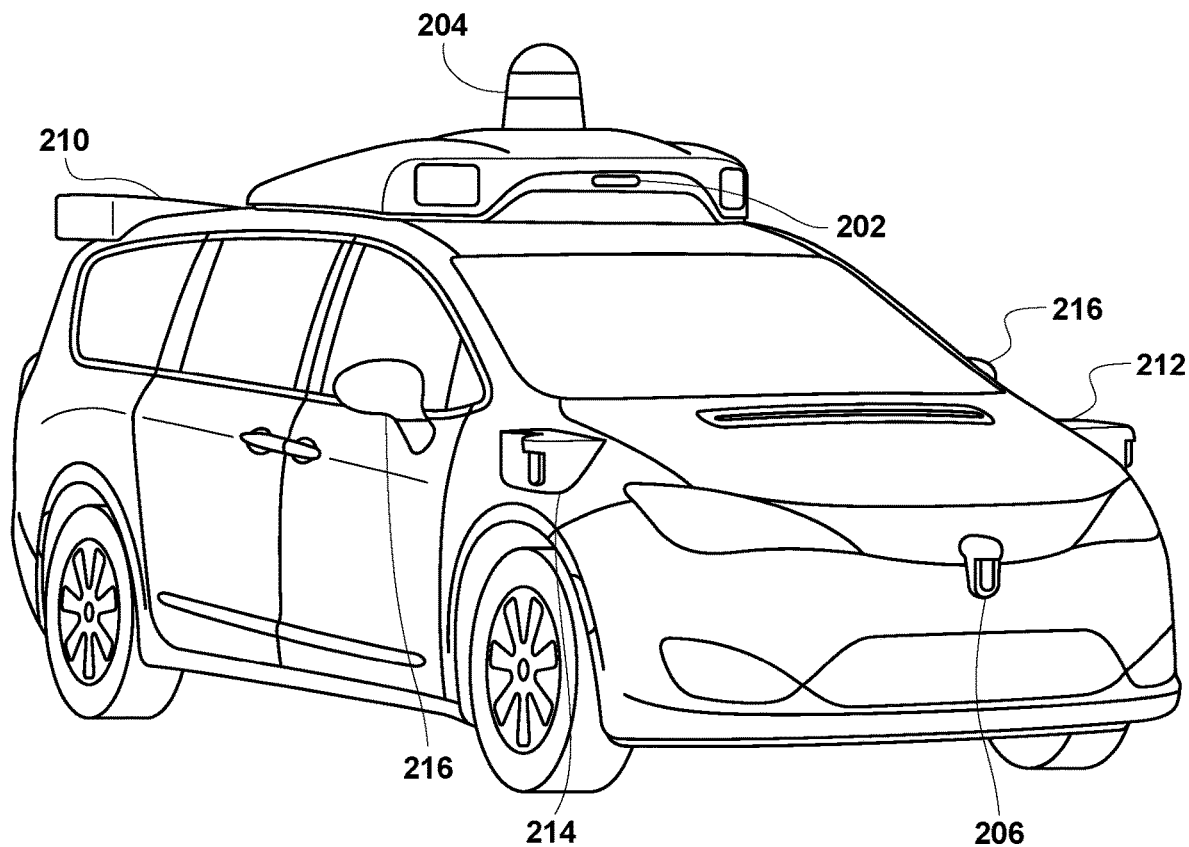
FIG. 2E is an illustration of a physical configuration of a vehicle, according to example embodiments.

Example methods and systems are contemplated herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the figures should not be viewed as limiting. It should be understood that other embodiments might include more or less of each element shown in a given figure. Further, some of the illustrated elements may be combined or omitted. Yet further, an example embodiment may include elements that are not illustrated in the figures.

I. Overview

Lidar devices (e.g., lidar devices for use in object detection and avoidance for an autonomous vehicle) may determine the range to a given object in a surrounding environment by determining the time of flight of a light signal. The transmitted light signal may be a light pulse (e.g., emitted from a pulsed laser source). Determining time of flight of the corresponding light pulses may include determining a time difference between the time when the light pulse is emitted from the lidar device and the receive time when a reflection of the light pulse from an object is detected by the lidar device. Such lidar devices may be used for object detection and/or avoidance in many computer vision contexts (e.g., within a robot or an autonomous vehicle). It is noted that, while lidar devices are described throughout the present disclosure, the techniques described herein could equally apply to other types of rangefinding devices (e.g., radar devices, sonar devices, etc.).

Accurately determining the locations of one or more objects using a lidar device, the lidar device may be dependent upon accurate calibration and/or localization. Traditionally, calibration and localization is performed by the lidar device (i) capturing data of calibration targets positioned at known distances relative to the sensor and/or known distances relative to other targets and/or (ii) capturing data of calibration targets having known reflectivities or reflectivity patterns. Such calibration targets may be referred to herein as "ground-truth calibration targets." Using the captured data generated from the lidar device observing the ground-truth calibration targets, modifications may be made in hardware and/or software to account for any discrepancies between the known calibration targets and the data measured using the sensors. For example, if a ground-truth calibration target is determined to be 11.01 m from a lidar device when in reality it is 11.00 m from the lidar device, a correction factor may be added in software. Such ground-truth calibration and localization techniques may take place at prespecified temporal intervals (e.g., a lidar device may be calibrated and/or localized using a ground-truth calibration target every day, every week, every month, etc.). Further, such calibration and/or localization techniques may be performed in a particular location that houses the calibration equipment. For example, a specific garage may have multiple arrangements of calibration targets used to calibrate and/or localize one or more lidar devices of an autonomous vehicle. As used herein, localization means the location and orientation of the vehicle within a world coordinate system (e.g., the location of the vehicle relative to objects within its environment, which may include the vehicle's GPS coordinates). Also as used herein, calibration means the location and orientation of the lidar device relative to the vehicle. In some embodiments, localization may be described by a localization transform (e.g., a localization matrix) and calibration may be described by a calibration transform (e.g., a calibration matrix).

After calibration and localization using a ground-truth calibration target, the vehicle may operate one or more of the associated, recently calibrated/localized lidar devices in run-time to perform object detection and avoidance, for example. However, as time goes on, the quality of the calibration and/or localization may degrade (e.g., because of mechanical shifts that arise within the optics of the lidar device or the camera due to heat or jostling caused by uneven road surfaces). In order to correct for such degraded calibration and localization, check-up or follow-up calibrations and/or localizations may be performed. Because only certain locations may house the equipment to perform ground-truth calibrations/localizations (e.g., using the ground-truth calibration targets within a calibration garage), though, it may be onerous for the vehicle to perform such check-up or follow-up calibrations/localizations (e.g., it may be a long distance back to the calibration garage and/or only a certain number of vehicles can use the calibration garage at a time, thereby resulting in a long wait time for calibration/localization during which the vehicle cannot be in use). Further, in some cases, the original ground-truth calibration and localization may have been performed with some portions of the lidar device disassembled or disconnected from other portions of the lidar device and/or from portions of the vehicle. As such, it may be unduly challenging, with or without the ground-truth calibration targets, to perform checkup calibrations/localizations.

Disclosed herein are techniques used to perform follow-up calibrations and localizations without using ground-truth calibration targets. In some embodiments, other lidar devices and associated vehicles within a vehicle fleet may be reliably calibrated/localized. For example, the lidar device of another vehicle within the fleet may have been recently calibrated and/or localized using ground-truth calibration targets (e.g., less than a threshold amount of time has passed since the vehicle's sensors were calibrated and/or localized using the ground-truth calibration targets). Because it may be presumed that the calibration and localization performed using ground-truth calibration targets remains valid for some period of time after completion of that calibration and localization, it may be presumed that recently calibrated/localized lidar devices are reliable. Other ways of assessing whether such calibration and localization is reliable may also be employed. For example, if a lidar device within the fleet has recently had its lidar device verified by another vehicle/lidar device in that fleet that, itself, was recently calibrated/validated, then it may be presumed that the lidar device is sufficiently calibrated/localized. Additionally, determining whether a lidar device and/or an associated vehicle are sufficiently calibrated/localized may include comparing a confidence level of accurate calibration to a calibration confidence threshold and a confidence level of accurate localization to a localization confidence threshold. The confidence thresholds may be predetermined (e.g., as set within a memory of a computing device corresponding to one or more of the vehicles and/or a computing device that manages the fleet of vehicles, such as a fleet server).

Once it has been determined that the additional vehicle/lidar device is sufficiently localized/calibrated (e.g., by confidence levels of accurate calibration and localization to a calibration confidence threshold and a localization confidence threshold, respectively), that additional vehicle/lidar device may be used to perform proxy calibrations and/or localizations on other vehicles in the fleet. In this way, vehicles in service (e.g., potentially far from a ground-truth calibration depot) can be calibrated/localized based on the sufficiently localized/calibrated lidar devices rather than returning to a calibration depot for calibration/localization using ground-truth calibration targets. In some embodiments, as also described herein, lidar devices not associated with a vehicle may be used to calibrate vehicles/lidar devices in the fleet. For example, a standalone lidar device mounted at a predetermined location (e.g., adjacent to a parking spot or along the side of a road) may be used to perform proxy calibrations/localizations of vehicles and associated lidar devices in the fleet (again, without the use of a ground-truth calibration target).

II. Example Embodiments

The following description and accompanying drawings will elucidate features of various example embodiments. The embodiments provided are by way of example, and are not intended to be limiting. As such, the dimensions of the drawings are not necessarily to scale.

Example systems within the scope of the present disclosure will now be described in greater detail. An example system may be implemented in or may take the form of an automobile. However, an example system may also be implemented in or take the form of other vehicles, such as cars, trucks, motorcycles, buses, boats, airplanes, helicopters, lawn mowers, earth movers, boats, snowmobiles, aircraft, recreational vehicles, amusement park vehicles, farm equipment, construction equipment, trams, golf carts, trains, trolleys, and robot devices. Other vehicles are possible as well. Further, in some embodiments, example systems might not include a vehicle.

Referring now to the figures, FIG. 1 is a functional block diagram illustrating example vehicle 100, which may be configured to operate fully or partially in an autonomous mode. More specifically, vehicle 100 may operate in an autonomous mode without human interaction through receiving control instructions from a computing system. As part of operating in the autonomous mode, vehicle 100 may use sensors to detect and possibly identify objects of the surrounding environment to enable safe navigation. In some embodiments, vehicle 100 may also include subsystems that enable a driver to control operations of vehicle 100.

As shown in FIG. 1, vehicle 100 may include various subsystems, such as propulsion system 102, sensor system 104, control system 106, one or more peripherals 108, power supply 110, computer system 112 (could also be referred to as a computing system), data storage 114, and user interface 116. In other examples, vehicle 100 may include more or fewer subsystems, which can each include multiple elements. The subsystems and components of vehicle 100 may be interconnected in various ways. In addition, functions of vehicle 100 described herein can be divided into additional functional or physical components, or combined into fewer functional or physical components within embodiments. For instance, the control system 106 and the computer system 112 may be combined into a single system that operates the vehicle 100 in accordance with various operations.

Propulsion system 102 may include one or more components operable to provide powered motion for vehicle 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, an electric motor, steam engine, or Stirling engine, among other possible options. For instance, in some embodiments, propulsion system 102 may include multiple types of engines and/or motors, such as a gasoline engine and an electric motor.

Energy source 119 represents a source of energy that may, in full or in part, power one or more systems of vehicle 100 (e.g., engine/motor 118). For instance, energy source 119 can correspond to gasoline, diesel, other petroleum-based fuels, propane, other compressed gas-based fuels, ethanol, solar panels, batteries, and/or other sources of electrical power. In some embodiments, energy source 119 may include a combination of fuel tanks, batteries, capacitors, and/or flywheels.

Transmission 120 may transmit mechanical power from engine/motor 118 to wheels/tires 121 and/or other possible systems of vehicle 100. As such, transmission 120 may include a gearbox, a clutch, a differential, and a drive shaft, among other possible components. A drive shaft may include axles that connect to one or more wheels/tires 121.

Wheels/tires 121 of vehicle 100 may have various configurations within example embodiments. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber.

Sensor system 104 can include various types of sensors, such as GPS 122, inertial measurement unit (IMU) 124, radar 126, laser rangefinder/lidar 128, camera 130, steering sensor 123, and throttle/brake sensor 125, among other possible sensors. In some embodiments, sensor system 104 may also include sensors configured to monitor internal systems of the vehicle 100 (e.g., 02 monitor, fuel gauge, engine oil temperature, brake wear).

GPS 122 may include a transceiver operable to provide information regarding the position of vehicle 100 with respect to the Earth. IMU 124 may have a configuration that uses one or more accelerometers and/or gyroscopes and may sense position and orientation changes of vehicle 100 based on inertial acceleration. For example, IMU 124 may detect a pitch and yaw of the vehicle 100 while vehicle 100 is stationary or in motion.

Radar 126 may represent one or more systems configured to use radio signals to sense objects, including the speed and heading of the objects, within the local environment of vehicle 100. As such, radar 126 may include antennas configured to transmit and receive radio signals. In some embodiments, radar 126 may correspond to a mountable radar system configured to obtain measurements of the surrounding environment of vehicle 100.

Laser rangefinder/lidar 128 may include one or more laser sources, a laser scanner, and one or more detectors, among other system components, and may operate in a coherent mode (e.g., using heterodyne detection) or in an incoherent detection mode. In some embodiments, the one or more detectors of the laser rangefinder/lidar 128 may include one or more photodetectors. Such photodetectors may be avalanche photodiodes (APDs). In some examples, such photodetectors may be capable of detecting single photons (e.g., SPADs). Further, such photodetectors can be arranged (e.g., through an electrical connection in series) into an array (e.g., as in a SiPM). In some examples, the one or more photodetectors are Geiger-mode operated devices and the lidar includes subcomponents designed for such Geiger-mode operation.

Camera 130 may include one or more devices (e.g., still camera or video camera) configured to capture images of the environment of vehicle 100.

Steering sensor 123 may sense a steering angle of vehicle 100, which may involve measuring an angle of the steering wheel or measuring an electrical signal representative of the angle of the steering wheel. In some embodiments, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, an angle of a gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., a butterfly valve or carburetor). Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, throttle/brake sensor 125 may be configured to measure a pressure applied to a pedal of the vehicle, such as a throttle or brake pedal.

Control system 106 may include components configured to assist in navigating vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100. Brake unit 136 may decelerate vehicle 100, which may involve using friction to decelerate wheels/tires 121. In some embodiments, brake unit 136 may convert kinetic energy of wheels/tires 121 to electric current for subsequent use by a system or systems of vehicle 100.

Sensor fusion algorithm 138 may include a Kalman filter, Bayesian network, or other algorithms that can process data from sensor system 104. In some embodiments, sensor fusion algorithm 138 may provide assessments based on incoming sensor data, such as evaluations of individual objects and/or features, evaluations of a particular situation, and/or evaluations of potential impacts within a given situation.

Computer vision system 140 may include hardware and software operable to process and analyze images in an effort to determine objects, environmental objects (e.g., traffic lights, roadway boundaries, etc.), and obstacles. As such, computer vision system 140 may use object recognition, Structure From Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. Obstacle avoidance system 144 may evaluate potential obstacles based on sensor data and cause systems of vehicle 100 to avoid or otherwise negotiate the potential obstacles.

As shown in FIG. 1, vehicle 100 may also include peripherals 108, such as wireless communication system 146, touchscreen 148, microphone 150, and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may wirelessly communicate with one or more devices directly or via a communication network. For example, wireless communication system 146 could use 3G cellular communication, such as code-division multiple access (CDMA), evolution-data optimized (EVDO), global system for mobile communications (GSM)/general packet radio service (GPRS), or cellular communication, such as 4G worldwide interoperability for microwave access (WiMAX) or long-term evolution (LTE), or 5G. Alternatively, wireless communication system 146 may communicate with a wireless local area network (WLAN) using WIFI® or other possible connections. Wireless communication system 146 may also communicate directly with a device using an infrared link, Bluetooth, or ZigBee, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

Vehicle 100 may include power supply 110 for powering components. Power supply 110 may include a rechargeable lithium-ion or lead-acid battery in some embodiments. For instance, power supply 110 may include one or more batteries configured to provide electrical power. Vehicle 100 may also use other types of power supplies. In an example embodiment, power supply 110 and energy source 119 may be integrated into a single energy source.

Vehicle 100 may also include computer system 112 to perform operations, such as operations described therein. As such, computer system 112 may include at least one processor 113 (which could include at least one microprocessor) operable to execute instructions 115 stored in a non-transitory, computer-readable medium, such as data storage 114. In some embodiments, computer system 112 may represent a plurality of computing devices that may serve to control individual components or subsystems of vehicle 100 in a distributed fashion.

In some embodiments, data storage 114 may contain instructions 115 (e.g., program logic) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle 100. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, and control system 106), as well as from user interface 116. For example, computer system 112 may utilize input from sensor system 104 in order to estimate the output produced by propulsion system 102 and control system 106. Depending upon the embodiment, computer system 112 could be operable to monitor many aspects of vehicle 100 and its subsystems. In some embodiments, computer system 112 may disable some or all functions of the vehicle 100 based on signals received from sensor system 104.

The components of vehicle 100 could be configured to work in an interconnected fashion with other components within or outside their respective systems. For instance, in an example embodiment, camera 130 could capture a plurality of images that could represent information about a state of an environment of vehicle 100 operating in an autonomous mode. The state of the environment could include parameters of the road on which the vehicle is operating. For example, computer vision system 140 may be able to recognize the slope (grade) or other features based on the plurality of images of a roadway. Additionally, the combination of GPS 122 and the features recognized by computer vision system 140 may be used with map data stored in data storage 114 to determine specific road parameters. Further, radar 126 may also provide information about the surroundings of the vehicle.

In other words, a combination of various sensors (which could be termed input-indication and output-indication sensors) and computer system 112 could interact to provide an indication of an input provided to control a vehicle or an indication of the surroundings of a vehicle.

In some embodiments, computer system 112 may make a determination about various objects based on data that is provided by systems other than the radio system. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors.

Although FIG. 1 shows various components of vehicle 100 (i.e., wireless communication system 146, computer system 112, data storage 114, and user interface 116) as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

FIGS. 2A-2E shows an example vehicle 200 that can include some or all of the functions described in connection with vehicle 100 in reference to FIG. 1. Although vehicle 200 is illustrated in FIGS. 2A-2E as a van for illustrative purposes, the present disclosure is not so limited. For instance, the vehicle 200 can represent a truck, a car, a semi-trailer truck, a motorcycle, a golf cart, an off-road vehicle, a farm vehicle, etc.

The example vehicle 200 includes a sensor unit 202, a first lidar unit 204, a second lidar unit 206, a first radar unit 208, a second radar unit 210, a first lidar/radar unit 212, a second lidar/radar unit 214, and two additional locations 216, 218 at which a radar unit, lidar unit, laser rangefinder unit, and/or other type of sensor or sensor(s) could be located on the vehicle 200. Each of the first lidar/radar unit 212 and the second lidar/radar unit 214 can take the form of a lidar unit, a radar unit, or both.

Furthermore, the example vehicle 200 can include any of the components described in connection with vehicle 100 of FIG. 1. The first and second radar units 208, 210 and/or the first and second lidar units 204, 206 can actively scan the surrounding environment for the presence of potential obstacles and can be similar to the radar 126 and/or laser rangefinder/lidar 128 in the vehicle 100.

The sensor unit 202 is mounted atop the vehicle 200 and includes one or more sensors configured to detect information about an environment surrounding the vehicle 200, and output indications of the information. For example, sensor unit 202 can include any combination of cameras, radars, lidars, range finders, inertial sensors, humidity sensors, and acoustic sensors. The sensor unit 202 can include one or more movable mounts that could be operable to adjust the orientation of one or more sensors in the sensor unit 202. In one embodiment, the movable mount could include a rotating platform that could scan sensors so as to obtain information from each direction around the vehicle 200. In another embodiment, the movable mount of the sensor unit 202 could be movable in a scanning fashion within a particular range of angles and/or azimuths and/or elevations. The sensor unit 202 could be mounted atop the roof of a car, although other mounting locations are possible.

Additionally, the sensors of sensor unit 202 could be distributed in different locations and need not be collocated in a single location. Some possible sensor types and mounting locations include the two additional locations 216, 218. Furthermore, each sensor of sensor unit 202 can be configured to be moved or scanned independently of other sensors of sensor unit 202.

In an example configuration, one or more radar scanners (e.g., first and second radar units 208, 210) can be located near the rear of the vehicle 200, to actively scan the environment near the back of the vehicle 200 for the presence of radio-reflective objects. Similarly, the first lidar/radar unit 212 and the second lidar/radar unit 214 may be mounted near the front of the vehicle 200 to actively scan the environment near the front of the vehicle 200. A radar scanner can be situated, for example, in a location suitable to illuminate a region including a forward-moving path of the vehicle 200 without occlusion by other features of the vehicle 200. For example, a radar scanner can be embedded in and/or mounted in or near the front bumper, front headlights, cowl, and/or hood, etc. Furthermore, one or more additional radar scanning devices can be located to actively scan the side and/or rear of the vehicle 200 for the presence of radio-reflective objects, such as by including such devices in or near the rear bumper, side panels, rocker panels, and/or undercarriage, etc.

Although not shown in FIGS. 2A-2E, the vehicle 200 can include a wireless communication system. The wireless communication system may include wireless transmitters and receivers that could be configured to communicate with devices external or internal to the vehicle 200. Specifically, the wireless communication system could include transceivers configured to communicate with other vehicles and/or computing devices, for instance, in a vehicular communication system or a roadway station. Examples of such vehicular communication systems include DSRC, radio frequency identification (RFID), and other proposed communication standards directed towards intelligent transport systems.

The vehicle 200 can include a camera, possibly at a location inside sensor unit 202. The camera can be a photosensitive instrument, such as a still camera, a video camera, etc., that is configured to capture a plurality of images of the environment of the vehicle 200. To this end, the camera can be configured to detect visible light, and can additionally or alternatively be configured to detect light from other portions of the spectrum, such as infrared or ultraviolet light. The camera can be a two-dimensional detector, and can optionally have a three-dimensional spatial range of sensitivity. In some embodiments, the camera can include, for example, a range detector configured to generate a two-dimensional image indicating distance from the camera to a number of points in the environment. To this end, the camera may use one or more range detecting techniques. For example, the camera can provide range information by using a structured light technique in which the vehicle 200 illuminates an object in the environment with a predetermined light pattern, such as a grid or checkerboard pattern and uses the camera to detect a reflection of the predetermined light pattern from environmental surroundings. Based on distortions in the reflected light pattern, the vehicle 200 can determine the distance to the points on the object. The predetermined light pattern may comprise infrared light, or radiation at other suitable wavelengths for such measurements. In some examples, the camera can be mounted inside a front windshield of the vehicle 200. Specifically, the camera can be situated to capture images from a forward-looking view with respect to the orientation of the vehicle 200. Other mounting locations and viewing angles of camera can also be used, either inside or outside the vehicle 200. Further, the camera can have associated optics operable to provide an adjustable field of view. Still further, the camera can be mounted to vehicle 200 with a movable mount to vary a pointing angle of the camera, such as via a pan/tilt mechanism.

The vehicle 200 may include one or more other components in addition to or instead of those shown. The additional components may include electrical or mechanical functionality.

A control system of the vehicle 200 may be configured to control the vehicle 200 in accordance with a control strategy from among multiple possible control strategies. The control system may be configured to receive information from sensors coupled to the vehicle 200 (on or off the vehicle 200), modify the control strategy (and an associated driving behavior) based on the information, and control the vehicle 200 in accordance with the modified control strategy. The control system further may be configured to monitor the information received from the sensors, and continuously evaluate driving conditions; and also may be configured to modify the control strategy and driving behavior based on changes in the driving conditions.

Figure 3:
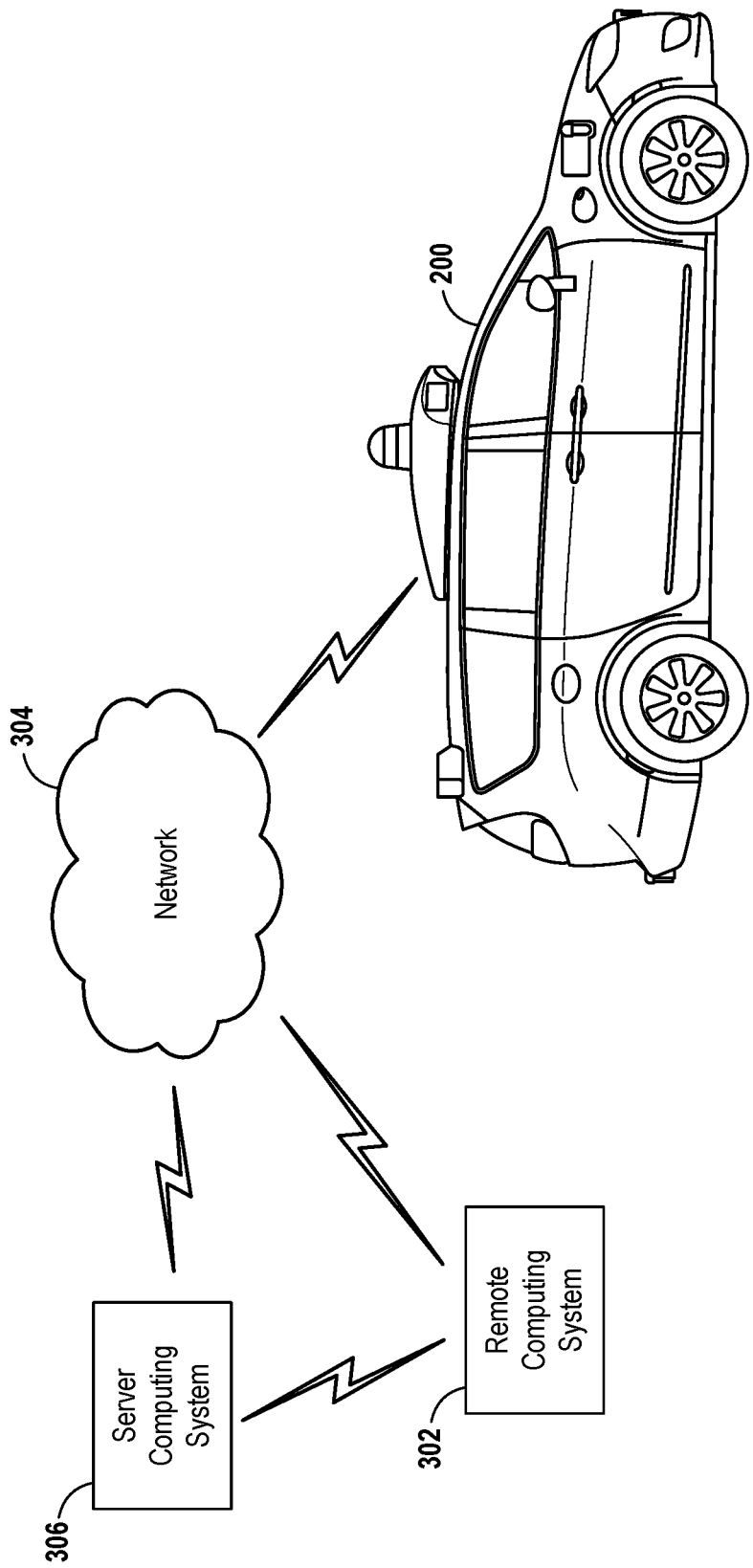
FIG. 3 is a conceptual illustration of wireless communication between various computing systems related to an autonomous vehicle, according to example embodiments.

FIG. 3 is a conceptual illustration of wireless communication between various computing systems related to an autonomous vehicle, according to example embodiments. In particular, wireless communication may occur between remote computing system 302 and vehicle 200 via network 304. Wireless communication may also occur between server computing system 306 and remote computing system 302, and between server computing system 306 and vehicle 200.

Vehicle 200 can correspond to various types of vehicles capable of transporting passengers or objects between locations, and may take the form of any one or more of the vehicles discussed above. In some instances, vehicle 200 may operate in an autonomous mode that enables a control system to safely navigate vehicle 200 between destinations using sensor measurements. When operating in an autonomous mode, vehicle 200 may navigate with or without passengers. As a result, vehicle 200 may pick up and drop off passengers between desired destinations.

Remote computing system 302 may represent any type of device related to remote assistance techniques, including but not limited to those described herein. Within examples, remote computing system 302 may represent any type of device configured to (i) receive information related to vehicle 200, (ii) provide an interface through which a human operator can in turn perceive the information and input a response related to the information, and (iii) transmit the response to vehicle 200 or to other devices. Remote computing system 302 may take various forms, such as a workstation, a desktop computer, a laptop, a tablet, a mobile phone (e.g., a smart phone), and/or a server. In some examples, remote computing system 302 may include multiple computing devices operating together in a network configuration.

Remote computing system 302 may include one or more subsystems and components similar or identical to the subsystems and components of vehicle 200. At a minimum, remote computing system 302 may include a processor configured for performing various operations described herein. In some embodiments, remote computing system 302 may also include a user interface that includes input/output devices, such as a touchscreen and a speaker. Other examples are possible as well.

Network 304 represents infrastructure that enables wireless communication between remote computing system 302 and vehicle 200. Network 304 also enables wireless communication between server computing system 306 and remote computing system 302, and between server computing system 306 and vehicle 200.

The position of remote computing system 302 can vary within examples. For instance, remote computing system 302 may have a remote position from vehicle 200 that has a wireless communication via network 304. In another example, remote computing system 302 may correspond to a computing device within vehicle 200 that is separate from vehicle 200, but with which a human operator can interact while a passenger or driver of vehicle 200. In some examples, remote computing system 302 may be a computing device with a touchscreen operable by the passenger of vehicle 200.

In some embodiments, operations described herein that are performed by remote computing system 302 may be additionally or alternatively performed by vehicle 200 (i.e., by any system(s) or subsystem(s) of vehicle 200). In other words, vehicle 200 may be configured to provide a remote assistance mechanism with which a driver or passenger of the vehicle can interact.

Server computing system 306 may be configured to wirelessly communicate with remote computing system 302 and vehicle 200 via network 304 (or perhaps directly with remote computing system 302 and/or vehicle 200). Server computing system 306 may represent any computing device configured to receive, store, determine, and/or send information relating to vehicle 200 and the remote assistance thereof. As such, server computing system 306 may be configured to perform any operation(s), or portions of such operation(s), that is/are described herein as performed by remote computing system 302 and/or vehicle 200. Some embodiments of wireless communication related to remote assistance may utilize server computing system 306, while others may not.

Server computing system 306 may include one or more subsystems and components similar or identical to the subsystems and components of remote computing system 302 and/or vehicle 200, such as a processor configured for performing various operations described herein, and a wireless communication interface for receiving information from, and providing information to, remote computing system 302 and vehicle 200.

The various systems described above may perform various operations. These operations and related features will now be described.

In line with the discussion above, a computing system (e.g., remote computing system 302, server computing system 306, or a computing system local to vehicle 200) may operate to use a camera to capture images of the environment of an autonomous vehicle. In general, at least one computing system will be able to analyze the images and possibly control the autonomous vehicle.

In some embodiments, to facilitate autonomous operation a vehicle (e.g., vehicle 200) may receive data representing objects in an environment in which the vehicle operates (also referred to herein as "environment data") in a variety of ways. A sensor system on the vehicle may provide the environment data representing objects of the environment. For example, the vehicle may have various sensors, including a camera, a radar unit, a laser range finder, a microphone, a radio unit, and other sensors. Each of these sensors may communicate environment data to a processor in the vehicle about information each respective sensor receives.

In one example, a camera may be configured to capture still images and/or video. In some embodiments, the vehicle may have more than one camera positioned in different orientations. Also, in some embodiments, the camera may be able to move to capture images and/or video in different directions. The camera may be configured to store captured images and video to a memory for later processing by a processing system of the vehicle. The captured images and/or video may be the environment data. Further, the camera may include an image sensor as described herein.

In another example, a radar unit may be configured to transmit an electromagnetic signal that will be reflected by various objects near the vehicle, and then capture electromagnetic signals that reflect off the objects. The captured reflected electromagnetic signals may enable the radar system (or processing system) to make various determinations about objects that reflected the electromagnetic signal. For example, the distances to and positions of various reflecting objects may be determined. In some embodiments, the vehicle may have more than one radar in different orientations. The radar system may be configured to store captured information to a memory for later processing by a processing system of the vehicle. The information captured by the radar system may be environment data.

In another example, a laser range finder may be configured to transmit an electromagnetic signal (e.g., infrared light, such as that from a gas or diode laser, or other possible light source) that will be reflected by target objects near the vehicle. The laser range finder may be able to capture the reflected electromagnetic (e.g., laser) signals. The captured reflected electromagnetic signals may enable the range-finding system (or processing system) to determine a range to various objects. The laser range finder may also be able to determine a velocity or speed of target objects and store it as environment data.

Additionally, in an example, a microphone may be configured to capture audio of the environment surrounding the vehicle. Sounds captured by the microphone may include emergency vehicle sirens and the sounds of other vehicles. For example, the microphone may capture the sound of the siren of an ambulance, fire engine, or police vehicle. A processing system may be able to identify that the captured audio signal is indicative of an emergency vehicle. In another example, the microphone may capture the sound of an exhaust of another vehicle, such as that from a motorcycle. A processing system may be able to identify that the captured audio signal is indicative of a motorcycle. The data captured by the microphone may form a portion of the environment data.

In yet another example, the radio unit may be configured to transmit an electromagnetic signal that may take the form of a Bluetooth signal, 802.11 signal, and/or other radio technology signal. The first electromagnetic radiation signal may be transmitted via one or more antennas located in a radio unit. Further, the first electromagnetic radiation signal may be transmitted with one of many different radio-signaling modes. However, in some embodiments it is desirable to transmit the first electromagnetic radiation signal with a signaling mode that requests a response from devices located near the autonomous vehicle. The processing system may be able to detect nearby devices based on the responses communicated back to the radio unit and use this communicated information as a portion of the environment data.

In some embodiments, the processing system may be able to combine information from the various sensors in order to make further determinations of the environment of the vehicle. For example, the processing system may combine data from both radar information and a captured image to determine if another vehicle or pedestrian is in front of the autonomous vehicle. In other embodiments, other combinations of sensor data may be used by the processing system to make determinations about the environment.

While operating in an autonomous mode, the vehicle may control its operation with little-to-no human input. For example, a human-operator may enter an address into the vehicle and the vehicle may then be able to drive, without further input from the human (e.g., the human does not have to steer or touch the brake/gas pedals), to the specified destination. Further, while the vehicle is operating autonomously, the sensor system may be receiving environment data. The processing system of the vehicle may alter the control of the vehicle based on environment data received from the various sensors. In some examples, the vehicle may alter a velocity of the vehicle in response to environment data from the various sensors. The vehicle may change velocity in order to avoid obstacles, obey traffic laws, etc. When a processing system in the vehicle identifies objects near the vehicle, the vehicle may be able to change velocity, or alter the movement in another way.

When the vehicle detects an object but is not highly confident in the detection of the object, the vehicle can request a human operator (or a more powerful computer) to perform one or more remote assistance tasks, such as (i) confirm whether the object is in fact present in the environment (e.g., if there is actually a stop sign or if there is actually no stop sign present), (ii) confirm whether the vehicle's identification of the object is correct, (iii) correct the identification if the identification was incorrect and/or (iv) provide a supplemental instruction (or modify a present instruction) for the autonomous vehicle. Remote assistance tasks may also include the human operator providing an instruction to control operation of the vehicle (e.g., instruct the vehicle to stop at a stop sign if the human operator determines that the object is a stop sign), although in some scenarios, the vehicle itself may control its own operation based on the human operator's feedback related to the identification of the object.

To facilitate this, the vehicle may analyze the environment data representing objects of the environment to determine at least one object having a detection confidence below a threshold. A processor in the vehicle may be configured to detect various objects of the environment based on environment data from various sensors. For example, in one embodiment, the processor may be configured to detect objects that may be important for the vehicle to recognize. Such objects may include pedestrians, street signs, other vehicles, indicator signals on other vehicles, and other various objects detected in the captured environment data.

The detection confidence may be indicative of a likelihood that the determined object is correctly identified in the environment, or is present in the environment. For example, the processor may perform object detection of objects within image data in the received environment data, and determine that the at least one object has the detection confidence below the threshold based on being unable to identify the object with a detection confidence above the threshold. If a result of an object detection or object recognition of the object is inconclusive, then the detection confidence may be low or below the set threshold.

The vehicle may detect objects of the environment in various ways depending on the source of the environment data. In some embodiments, the environment data may come from a camera and be image or video data. In other embodiments, the environment data may come from a lidar unit. The vehicle may analyze the captured image or video data to identify objects in the image or video data. The methods and apparatuses may be configured to monitor image and/or video data for the presence of objects of the environment. In other embodiments, the environment data may be radar, audio, or other data. The vehicle may be configured to identify objects of the environment based on the radar, audio, or other data.

In some embodiments, the techniques the vehicle uses to detect objects may be based on a set of known data. For example, data related to environmental objects may be stored to a memory located in the vehicle. The vehicle may compare received data to the stored data to determine objects. In other embodiments, the vehicle may be configured to determine objects based on the context of the data. For example, street signs related to construction may generally have an orange color. Accordingly, the vehicle may be configured to detect objects that are orange, and located near the side of roadways as construction-related street signs. Additionally, when the processing system of the vehicle detects objects in the captured data, it also may calculate a confidence for each object.

Further, the vehicle may also have a confidence threshold. The confidence threshold may vary depending on the type of object being detected. For example, the confidence threshold may be lower for an object that may require a quick responsive action from the vehicle, such as brake lights on another vehicle. However, in other embodiments, the confidence threshold may be the same for all detected objects.

When the confidence associated with a detected object is greater than the confidence threshold, the vehicle may assume the object was correctly recognized and responsively adjust the control of the vehicle based on that assumption.

When the confidence associated with a detected object is less than the confidence threshold, the actions that the vehicle takes may vary. In some embodiments, the vehicle may react as if the detected object is present despite the low confidence level. In other embodiments, the vehicle may react as if the detected object is not present.

When the vehicle detects an object of the environment, it may also calculate a confidence associated with the specific detected object. The confidence may be calculated in various ways depending on the embodiment. In one example, when detecting objects of the environment, the vehicle may compare environment data to predetermined data relating to known objects. The closer the match between the environment data and the predetermined data, the higher the confidence. In other embodiments, the vehicle may use mathematical analysis of the environment data to determine the confidence associated with the objects.

In response to determining that an object has a detection confidence that is below the threshold, the vehicle may transmit, to the remote computing system, a request for remote assistance with the identification of the object. As discussed above, the remote computing system may take various forms. For example, the remote computing system may be a computing device within the vehicle that is separate from the vehicle, but with which a human operator can interact while a passenger or driver of the vehicle, such as a touchscreen interface for displaying remote assistance information. Additionally or alternatively, as another example, the remote computing system may be a remote computer terminal or other device that is located at a location that is not near the vehicle.

The request for remote assistance may include the environment data that includes the object, such as image data, audio data, etc. The vehicle may transmit the environment data to the remote computing system over a network (e.g., network 304), and in some embodiments, via a server (e.g., server computing system 306). The human operator of the remote computing system may in turn use the environment data as a basis for responding to the request.

In some embodiments, when the object is detected as having a confidence below the confidence threshold, the object may be given a preliminary identification, and the vehicle may be configured to adjust the operation of the vehicle in response to the preliminary identification. Such an adjustment of operation may take the form of stopping the vehicle, switching the vehicle to a human-controlled mode, changing a velocity of vehicle (e.g., a speed and/or direction), among other possible adjustments.

In other embodiments, even if the vehicle detects an object having a confidence that meets or exceeds the threshold, the vehicle may operate in accordance with the detected object (e.g., come to a stop if the object is identified with high confidence as a stop sign), but may be configured to request remote assistance at the same time as (or at a later time from) when the vehicle operates in accordance with the detected object.

Figure 4A:
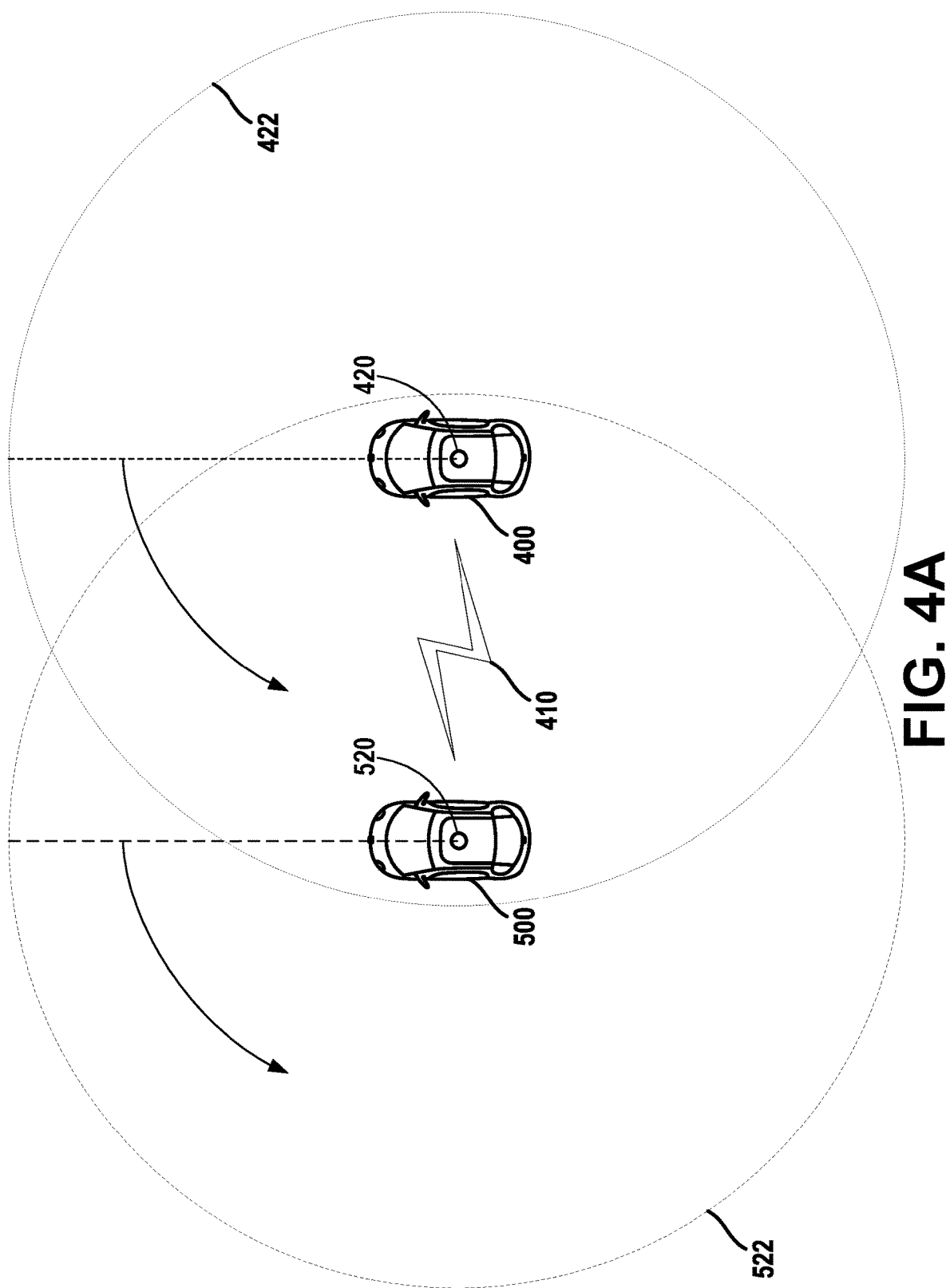
FIG. 4A is an illustration of an arrangement of lidar devices used to calibrate and localize at least one of the lidar devices, according to example embodiments.

One example embodiment of a proxy calibration technique performed by a sufficiently localized/calibrated lidar device is illustrated in FIG. 4A. As illustrated, a first vehicle 400 (alternatively referred to herein as a "reference vehicle") may be positioned adjacent to a second vehicle 500 (alternatively referred to herein as a "beneficiary vehicle"). The reference vehicle 400 may have a first lidar device 420 (alternatively referred to herein as a "reference lidar device"). Similarly, the beneficiary vehicle 500 may have a second lidar device 520 (alternatively referred to herein as a "beneficiary lidar device"). The reference lidar device 420 and the reference vehicle 400 may be sufficiently localized and calibrated (e.g., a calibration confidence level and a localization confidence level of the reference lidar device 420 may exceed corresponding confidence thresholds). Whether the reference lidar device 420 and the reference vehicle 400 are sufficiently localized and calibrated may be determined by a computing device onboard the reference vehicle 400 and/or onboard the reference lidar device 420. Additionally or alternatively, whether the reference lidar device 420 and the reference vehicle 400 are sufficiently localized and calibrated may be determined by a computing device onboard the beneficiary vehicle 500 and/or onboard the beneficiary lidar device 520 and/or a computing device used for management of a vehicle fleet of which the reference vehicle 400 and the beneficiary vehicle 500 are both a part (e.g., a fleet server that receives and processed information from vehicles within the fleet).

The proxy calibration technique of FIG. 4A may be performed, as illustrated, with the reference vehicle 400 and the beneficiary vehicle 500 positioned adjacent to one another and having roughly the same pose (i.e., same orientation in yaw, pitch, and roll). The proxy calibration technique may include the reference lidar device 420 capturing a first point cloud (i.e., a "reference point cloud") by performing a first lidar scan 422 (i.e., a "reference lidar scan"). Lidar scans, as described herein, may include a capturing of a multitude of points using a rotating lidar device. For example, the lidar device may rotate 360° in azimuth and capture points at various increments (e.g., at each 0.1° of the scan). In addition, lidar scans may capture points at various elevation angles (e.g., including multiple elevation angles for each azimuthal position). The proxy calibration technique may also include the beneficiary lidar device 520 capturing a second point cloud (i.e., a "beneficiary point cloud") by performing a second lidar scan 522 (i.e., a "beneficiary lidar scan"). Further, as illustrated in FIG. 4A, the reference vehicle 400 and the beneficiary vehicle 500 may be positioned close enough to one another such that the reference lidar scan 422 performed by the reference lidar device 420 can detect at least a portion of the beneficiary vehicle 500 and/or such that the beneficiary lidar scan 522 performed by the beneficiary lidar device 520 can detect at least a portion of the reference vehicle 400. In other words, the reference point cloud may include points representing the beneficiary vehicle 500 and the beneficiary point cloud may include points representing the reference vehicle 400.

In addition, in some embodiments, the beneficiary vehicle 500 and/or the reference vehicle 400 may remain stationary while the reference lidar device 420 captures the reference point cloud. Similarly, in some embodiments, the beneficiary vehicle 500 and/or the reference vehicle 400 may remain stationary while the beneficiary lidar device 520 captures the beneficiary point cloud. Still further, the reference point cloud and the beneficiary point cloud may be captured simultaneously. Alternatively, the reference point cloud and the beneficiary point cloud may be captured sequentially.

Once the reference point cloud and the beneficiary point cloud are captured by the reference lidar device 420 and the beneficiary lidar device 520, respectively, the reference point cloud and the beneficiary point cloud may be sent to a computing device (e.g., a computing device of the reference vehicle 400, a computing device of the reference lidar device 420, a computing device of the beneficiary vehicle 500, a computing device of the beneficiary lidar device 520, or a fleet management server). For example, a computing device of the beneficiary vehicle 500 may receive the beneficiary point cloud from its own lidar device (i.e., the beneficiary lidar device 520) and also receive the reference point cloud from the reference vehicle 400. The computing device of the beneficiary vehicle 500 may communicate with the reference vehicle 400 using a communication link 410. The communication link 410 may be a wireless communication link (e.g., a WIFI communication link or a BLUETOOTH communication link), in some embodiments. Similarly, in embodiments where both the beneficiary vehicle 500 and the reference vehicle 400 are communicating with a fleet management server, communication links may exist between the reference vehicle 400 and the fleet management server and/or between the beneficiary vehicle 500 and the fleet management server.

The computing device that receives the reference point cloud and the beneficiary point cloud may calibrate and/or localize the beneficiary vehicle 500 and/or the beneficiary lidar device 520. To perform such a calibration and/or localization, the computing device (e.g., the computing device of the beneficiary vehicle 500) may also receive additional data. For example, the computing device may receive a reference localization transform associated with the reference vehicle 400 and a reference calibration transform associated with the reference vehicle 400. The reference localization transform and the reference calibration transform may describe the localization and calibration of the reference vehicle 400 and, because the reference vehicle 400 has been determined to be sufficiently localized/calibrated, the reference localization transform and the reference calibration transform may be used by the computing device to calibrate and/or localize the beneficiary vehicle 500 (e.g., to determine a calibration transform and/or a localization transform for the beneficiary vehicle 500). The reference localization transform may be usable (e.g., by the computing device) to transform between a coordinate system of the reference vehicle 400 (e.g., a three-dimensional coordinate system having the position of the reference lidar device 420 as its origin) and a world coordinate system.

In addition to receiving the reference localization transform and the reference calibration transform, the computing device may also receive a third point cloud that represents the reference vehicle 400 (alternatively referred to herein as a "vehicle-shape point cloud"). The vehicle-shape point cloud may be generated by sampling a three-dimensional model that represents the reference vehicle 400. For example, if the computing device is onboard the beneficiary vehicle 500, the computing device may receive a three-dimensional model that represents the reference vehicle 400 (e.g., a computer-aided design (CAD) model that depicts the body shape of the reference vehicle 400) by communicating with a computing device onboard the reference vehicle 400. Then, the computing device onboard the beneficiary vehicle 500 may sample points of the CAD model of the reference vehicle 400 to generate a point cloud representing the reference vehicle 400 (i.e., the vehicle-shape point cloud).

Alternatively, in some embodiments, the computing device onboard the beneficiary vehicle 500 may have access to a three-dimensional model of itself (e.g., a CAD model that depicts the body shape of the beneficiary vehicle 500). Additionally, it may be known that the reference vehicle 400 and the beneficiary vehicle 500 have the same vehicle geometry (e.g., a body shape of the reference vehicle 400 is the same as a body shape of the beneficiary vehicle 500 because the vehicle make and model of the reference vehicle 400 is the same as the vehicle make and model of the beneficiary vehicle 500). Based on this knowledge, the computing device of the beneficiary vehicle 500 may sample its own CAD model to generate a point cloud of itself (i.e., the vehicle-shape point cloud) that, coincidentally, can also be used as a point cloud representing the reference vehicle 400.

In still other embodiments, the vehicle-shape point cloud may be generated by capturing an auxiliary point cloud using an auxiliary lidar device (e.g., a freestanding lidar device or a lidar device associated with a third vehicle not pictured in FIG. 4A) and extracting the vehicle-shape point cloud from the auxiliary point cloud based on the reference pose information. For example, the auxiliary lidar device may perform an auxiliary lidar scan to capture the auxiliary point cloud. The auxiliary lidar device may be positioned close enough to the reference vehicle 400 such that the auxiliary lidar scan performed by the auxiliary lidar device can detect at least a portion of the reference vehicle 400. This auxiliary point cloud may then be transmitted to the computing device to perform the rest of the calculations (e.g., the computing device of the beneficiary vehicle 500). That computing device may then extract the vehicle-shape point cloud from the auxiliary point cloud based on the reference pose information (e.g., the vehicle-shape point cloud may correspond to a subset of points within the auxiliary point cloud).

Further, the computing device may also receive pose information about the reference vehicle 400 (e.g., orientation information about the reference vehicle 400). The pose information about the reference vehicle 400 may alternatively be referred to herein as reference pose information.

Using the reference calibration transform, the reference localization transform, the reference point cloud, the beneficiary point cloud, the vehicle-shape point cloud, and the reference pose information, the computing device may calibrate and localize the beneficiary vehicle 500 and/or the beneficiary lidar device 520. In some embodiments, the beneficiary vehicle 500 and/or the beneficiary lidar device 520 may be calibrated and/or localized using the transformations and calculations described below.

The following portions of the description describe steps that may be performed by a computing device to calibrate and/or localize the beneficiary vehicle 500 and/or beneficiary lidar device 520. It is understood that other steps are possible and contemplated herein. Further, it is understood that multiple of the following steps could be combined, performed in different orders, and/or omitted in various embodiments without departing from the scope of the present disclosure. Further, it is reiterated that the following calculations could equally be performed by a computing device onboard the beneficiary vehicle 500 and/or beneficiary lidar device 520, a computing device onboard the reference vehicle 400 and/or reference lidar device 420, and/or a fleet management server, in various embodiments.

As a first step, the computing device may transform the vehicle-shape point cloud ($C_V$) into a transformed reference vehicle-shape point cloud ($C_W^{Reference}$). The transformed reference vehicle-shape point cloud ($C_W^{Reference}$) may be represented in the world coordinate system. This transformation may be performed as follows using the reference localization transform ($F_L^{Reference}$).

$$C_W^{Reference} = F_L^{Reference}(C_V)$$

Next, the computing device may determine a location of the beneficiary lidar device 520 in the world coordinate system. In some embodiments, determining the location of the beneficiary lidar device 520 in the world coordinate system may include determining a vehicle-vehicle transform ($F_M$) that transforms points from a coordinate system of the beneficiary vehicle 500 to a coordinate system of the reference vehicle 400. In order to determine the vehicle-vehicle transform ($F_M$), the computing device may match the reference point cloud to the beneficiary point cloud using a surface matching algorithm (e.g., an iterative closest points algorithm). The surface matching algorithm may be used to identify similarly shaped and/or similarly sized surfaces contained in different point clouds. Similarly shaped and/or similarly sized surfaces may be presumed to be the same surface. As such, based on the fact that a single object is the same object in two coordinate systems, and based on the orientation and position of that object in both coordinate systems, a transform between the two coordinate systems may be determined. In some embodiments, the surface matching algorithm may be robust, and so similarity in pose between the beneficiary vehicle 500 and the reference vehicle 400 may not be absolutely necessary when capturing the respective point clouds. In other embodiments, the surface matching algorithm may require more accuracy of position, in which case the pose of the beneficiary vehicle 500 may be relatively similar to the pose of the reference vehicle 400 when capturing the respective point clouds.

By definition of the vehicle-vehicle transform ($F_M$), for any point (x) in the coordinate system of the beneficiary, the following is true:

$$(F_L^{Reference} \circ F_C^{Reference})(F_M(x)) =$$
$$(F_L^{Beneficiary} \circ F_C^{Beneficiary})(x)$$

The above can be reduced to:

$$F_L^{Beneficiary} \circ F_C^{Beneficiary} = F_L^{Reference} \circ F_C^{Reference} \circ F_M$$

Based on the above, the computing device can determine the location of the beneficiary lidar device 520 in the world coordinate system ($p_W^{Beneficiary\ Lidar}$). This determination may be made based on the transforms above as well as the fact that the beneficiary lidar device 520 is, by definition, at the origin of the beneficiary coordinate system (i.e., is at location $(0,0,0)^T$ of the beneficiary coordinate system). As such, the computing device may compute the location of the beneficiary lidar device 520 in the world coordinate system using the following equation:

$$p_W^{BeneficiaryLidar} =$$
$$(F_L^{Beneficiary} \circ F_C^{Beneficiary})((0,0,0)^T) = (F_L^{Reference} \circ F_C^{Reference} \circ F_M)((0,0,0)^T)$$

Under a similar rationale to the beneficiary lidar device 520, the reference lidar device 420 is, by definition, at the origin of the reference coordinate system (i.e., is at location $(0,0,0)^T$ of the reference coordinate system). The computing device may also compute the location of the reference lidar device 420 in the world coordinate system ($p_W^{Reference\ Lidar}$). Because it was previously determined that the localization and the calibration of the reference lidar device 420 are reliable, though, the computing device can simply use the reference localization transform ($F_L^{Reference}$) and the reference calibration transform ($F_C^{Reference}$) of the reference lidar device 420/reference vehicle 400, itself, to make this calculation, rather than having to rely on the reference localization transform ($F_L^{Reference}$) and the reference calibration transform ($F_C^{Reference}$) of the reference lidar device 420/reference vehicle 400 combined with the vehicle-vehicle transform ($F_M$) like when calculating the location of the beneficiary lidar device 520 in the world coordinate system ($p_W^{Beneficiary\ Lidar}$). As such, the computing device may determine the location of the reference lidar device 420 in the world coordinate system ($p_W^{Reference\ Lidar}$) using the following equation:

$$p_W^{Reference\ Lidar} = (F_L^{Reference} \circ F_C^{Reference})((0,0,0)^T)$$

Thereafter, the computing device may determine an inverse vehicle-vehicle transform ($F_M'$) that transforms points from the coordinate system of the reference vehicle 400 to the coordinate system of the beneficiary vehicle 500. Determining the inverse vehicle-vehicle transform ($F_M'$) may include performing a surface matching algorithm (e.g., an iterative closest points algorithm, as described above).

In embodiments where the orientation of the beneficiary vehicle 500 and the orientation of the reference vehicle 400 are relatively similar when the reference lidar scan 422 captured the reference point cloud ($S_L^{Reference}$), the computing device may set the initial transform for the surface matching algorithm as a translation without rotation. The translation may be equal to the differences in location between the beneficiary lidar device 520 and the reference lidar device 420 (both in the world coordinate system):

$$p_W^{Beneficiary\ Lidar} - p_W^{Reference\ Lidar}$$

Additionally or alternatively, determining the inverse vehicle-vehicle transform ($F_M'$) may include performing a part-to-whole matching between the transformed reference vehicle-shape point cloud ($C_W^{Reference}$), calculated above, and a transformed reference point cloud ($S_W^{Reference}$). Similar to the location of the reference lidar device 420 in the world coordinate system ($p_W^{Reference\ Lidar}$) the transformed reference vehicle-shape point cloud ($C_W^{Reference}$), which is also represented in the world coordinate system, may be determined based on the reference localization transform ($F_L^{Reference}$) of the reference lidar device 420/reference vehicle 400, the reference calibration transform ($F_C^{Reference}$) of the reference lidar device 420/reference vehicle 400, and the reference point cloud ($S_L^{Reference}$) captured by the reference lidar device 420. This calculation may be performed by the computing device according to the following equation:

$$S_W^{Reference} = (F_L^{Reference} \circ F_C^{Reference})(S_L^{Reference})$$

In some embodiments, prior to performing a part-to-whole matching as described above, the vehicle-shape point cloud ($C_V$), prior to being transformed into the transformed reference vehicle-shape point cloud ($C_W^{Reference}$), or the transformed reference vehicle-shape point cloud ($C_W^{Reference}$), itself, may be cropped to improve the results of the part-to-whole matching. For example, where the beneficiary lidar device 520 is in a different location relative to the beneficiary vehicle 500 from a location of the lidar device within the three-dimensional model used to generate the vehicle-shape point cloud ($C_V$), the lidar device may be removed from the vehicle-shape point cloud ($C_V$). Additionally or alternatively, tires may be removed from the vehicle-shape point cloud ($C_V$), prior to being transformed into the transformed reference vehicle-shape point cloud ($C_W^{Reference}$), or from the transformed reference vehicle-shape point cloud ($C_W^{Reference}$). This may improve the results of the part-to-whole matching as the orientation of the actual tires of the beneficiary vehicle 500 as captured by the reference point cloud ($S_L^{Reference}$) may not match the orientation of the tires in the three-dimensional model used to generate the vehicle-shape point cloud ($C_V$). Other croppings and/or alterations to the vehicle-shape point cloud ($C_V$) or the transformed reference vehicle-shape point cloud ($C_W^{Reference}$) are also possible and contemplated herein.

Still further, the computing device may determine the pose of the beneficiary vehicle 500 by applying the inverse vehicle-vehicle transform ($F_M'$) to the pose information of the reference vehicle, among other information. Further, the computing device may then determine the beneficiary localization transform ($F_L^{Beneficiary}$) (i.e., the computing device may fully localize the beneficiary vehicle 500 or beneficiary lidar device 520) based on the inverse vehicle-vehicle transform ($F_M'$) and the pose information of the reference vehicle.

Lastly, the computing device may determine the beneficiary calibration transform ($F_C^{Beneficiary}$ (i.e., the computing device may fully calibrate the beneficiary vehicle 500 or beneficiary lidar device 520). The beneficiary calibration transform may be determined based on an inverse of the beneficiary localization transform ($F_L^{Beneficiary})^{-1}$, the reference localization transform ($F_L^{Reference}$) the reference calibration transform ($F_C^{Reference}$), and the vehicle-vehicle transform ($F_M$). This may be done using the following equation:

$$F_C^{Beneficiary} = (F_L^{Beneficiary})^{-1} \circ F_L^{Reference} \circ F_C^{Reference} \circ F^M$$

Based on the above calculations performed by the computing device (or some subset of the above calculations), the beneficiary lidar device 520 and the beneficiary vehicle 500 may now be calibrated and localized. Because the beneficiary lidar device 520 and the beneficiary vehicle 500 were calibrated using a sufficiently well-calibrated and well-localized lidar device/vehicle (the reference lidar device 420 and the reference vehicle 400), the beneficiary vehicle 500 and the beneficiary lidar device 520 may now be deemed to also be sufficiently well-calibrated and well-localized. In some embodiments, confidence levels associated with accurate calibration/localization of the beneficiary lidar device 520 and the beneficiary vehicle 500 may be updated after performing the calibration/localization described above. The updated confidence levels may exceed the respective calibration/localization confidence thresholds. As such, moving forward, the beneficiary vehicle 500 and the beneficiary lidar device 520 may serve as a reference lidar device/reference vehicle for additional lidar devices/vehicles. Further, now that the calibration and localization of the beneficiary vehicle 500 and the beneficiary lidar device 520 has been updated, the beneficiary vehicle 500 and the beneficiary lidar device 520 may be reliably deployed to perform additional fleet tasks (e.g., the beneficiary vehicle 500 may reliably return to autonomous vehicle tasks, such as transporting passengers).

In some embodiments, multiple calibrations and/or localizations of a beneficiary vehicle 500/beneficiary lidar device 520 may be performed using one or more sufficiently well-calibrated and well-localized vehicles and/or lidar devices (e.g., the reference vehicle 400 and/or the reference lidar device 420). The results of such multiple calibrations and/or localizations can then be combined (e.g., averaged) to determine an ultimate calibration and/or localization for the beneficiary vehicle 500.

Figure 4B:
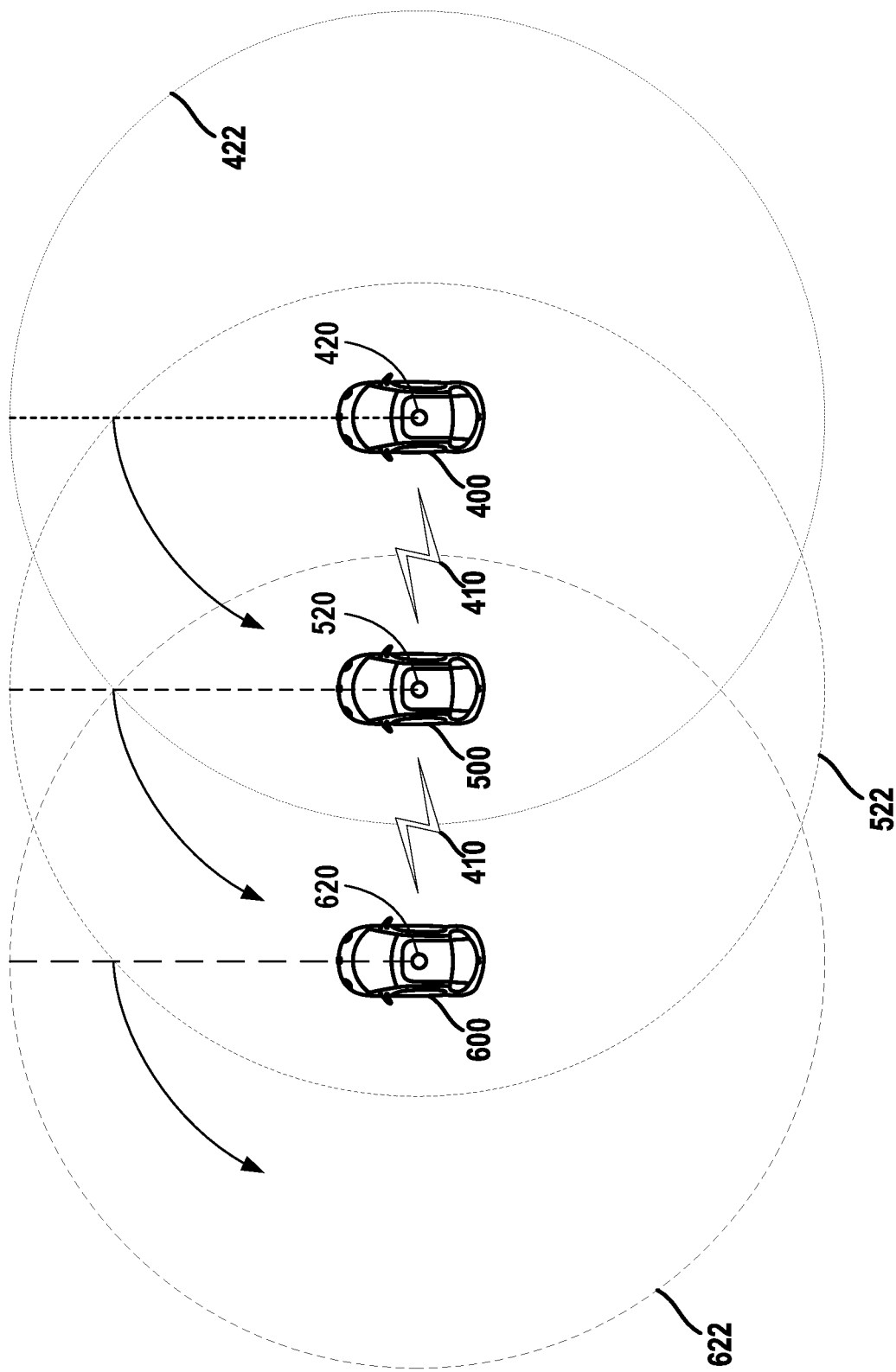
FIG. 4B is an illustration of an arrangement of lidar devices used to calibrate and localize at least one of the lidar devices, according to example embodiments.

For example, as illustrated in FIG. 4B, an auxiliary reference vehicle 600 with an auxiliary reference lidar device 620 may capture an auxiliary reference point cloud that includes the beneficiary vehicle 500 and the beneficiary lidar device 520 (e.g., from a different perspective than used for the reference lidar scan 422). The auxiliary reference point cloud may be captured by an auxiliary reference lidar scan 622. The auxiliary reference point cloud may be captured simultaneously with the reference point cloud captured by the reference lidar device 420 (i.e., the reference lidar scan 422 and the auxiliary reference lidar scan 422 may be performed simultaneously), in some embodiments. Using steps similar to those described above, a computing device may then calculate an auxiliary calibration and/or auxiliary localization of the beneficiary vehicle 500 and/or beneficiary lidar device 520.

Thereafter, the computing device may average (e.g., component-wise) a calibration matrix derived based on the reference point cloud and an auxiliary calibration matrix derived based on the auxiliary reference point cloud to determine a final calibration matrix for the beneficiary vehicle 500 and/or beneficiary lidar device 520. Similarly, the computing device may average (e.g., component-wise) a localization matrix derived based on the reference point cloud and an auxiliary localization matrix derived based on the auxiliary reference point cloud to determine a final localization matrix for the beneficiary vehicle 500 and/or beneficiary lidar device 520. In some embodiments, rather than a simple averaging, the localization and/or calibration matrices may be weighted against the auxiliary localization and/or auxiliary calibration matrices, respectively. The weighting may be based on a comparison between the calibration confidence level and/or the localization confidence level associated with the reference vehicle 400/reference lidar device 420 and an auxiliary calibration confidence level and/or auxiliary localization confidence level associated with the auxiliary reference vehicle 600/auxiliary reference lidar device 620. For example, if the localization confidence level is higher than the auxiliary localization confidence level, components of the localization matrix may be weighted more heavily than components of the auxiliary localization matrix when determining the final localization matrix. Similarly, if the calibration confidence level is higher than the auxiliary calibration confidence level, components of the calibration matrix may be weighted more heavily than components of the auxiliary calibration matrix when determining the final calibration matrix. In still other embodiments, more sophisticated techniques for combining multiple localization matrices into a final localization matrix and/or combining multiple calibration matrices into a final calibration matrix may be used. For example, regression techniques (e.g., linear regression, quadratic regression, etc.) may be employed. While FIG. 4B illustrates only two reference vehicles/reference lidar devices, it is understood that additional reference vehicles/reference lidar devices may be used without departing from the scope of this disclosure.

Figure 4C:
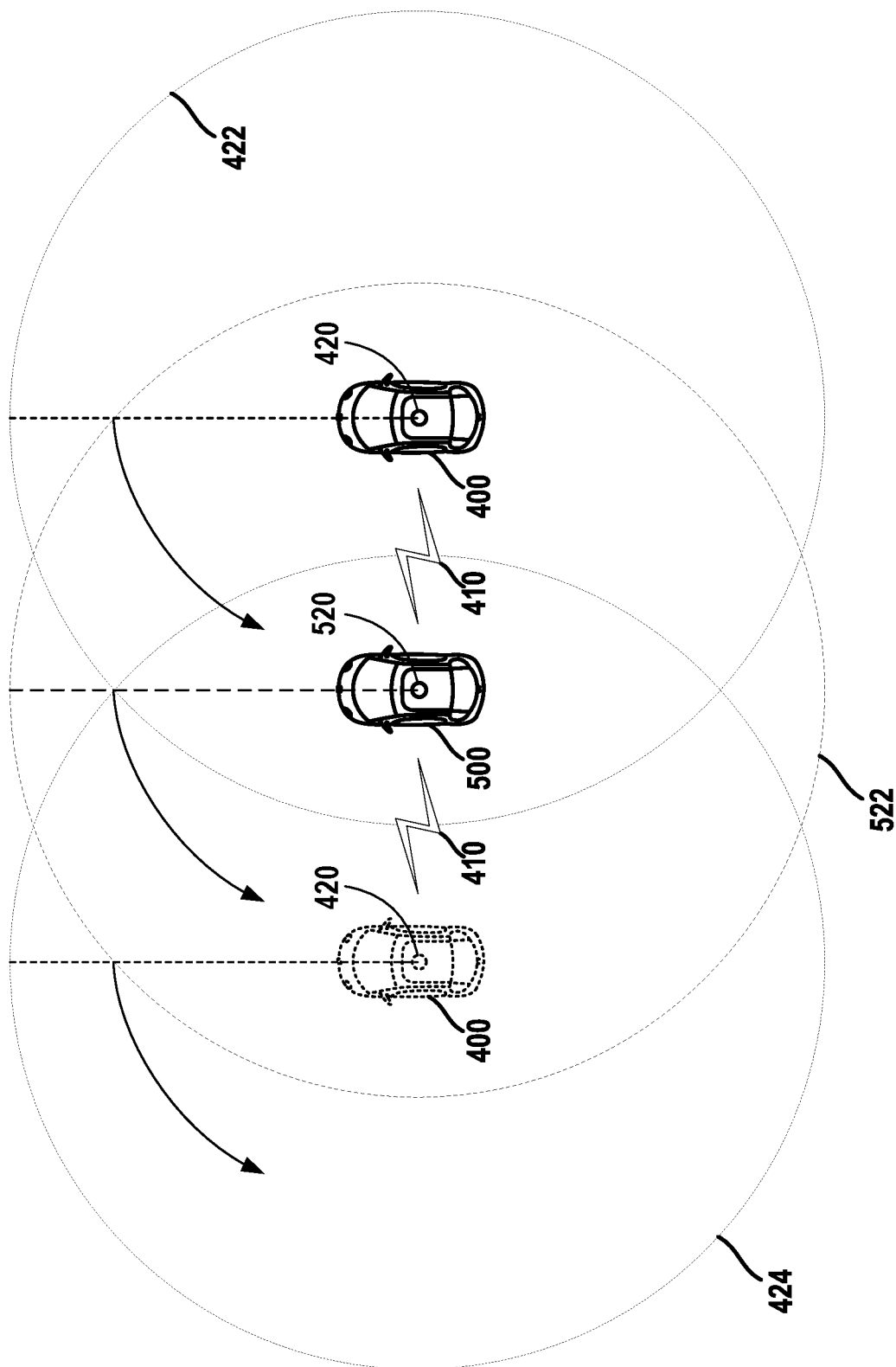
FIG. 4C is an illustration of an arrangement of lidar devices used to calibrate and localize at least one of the lidar devices, according to example embodiments.

In other embodiments, rather than using multiple reference vehicles/reference lidar devices to capture multiple reference point clouds, a single reference vehicle/reference lidar device may capture multiple reference point clouds at different positions. For example, as illustrated in FIG. 4C, the reference vehicle 400 and the reference lidar device 420 may capture a first reference point cloud from one location relative to the beneficiary vehicle 500 (e.g., along a passenger side of the beneficiary vehicle 500) and may then move to a different location relative to the beneficiary vehicle 500 (e.g., along a driver side of the beneficiary vehicle 500) to capture a second reference point cloud. The second reference point cloud may be captured by an additional reference lidar scan 424. The second location of the reference vehicle 400 is illustrated in FIG. 4C by the dashed outline of the reference vehicle 400. In such embodiments, to perform the preliminary calibrations and/or localizations (e.g., before an average or a weighted average of the resulting matrices is performed), the beneficiary vehicle 500/beneficiary lidar device 520 may capture multiple beneficiary point clouds using multiple beneficiary lidar scans (e.g., one when the reference vehicle 400 is positioned on a passenger side of the beneficiary vehicle 500 and one when the reference vehicle 400 is positioned on a driver side of the beneficiary vehicle 500).

As with the example illustrated in FIG. 4B, the resulting localization matrices and/or calibration matrices may be averaged or otherwise combined together to determine a final localization matrix and/or final calibration matrix for the beneficiary vehicle 500.

While FIGS. 4A-4C depict reference lidar devices attached to reference vehicles, it is understood that equally valid calibrations and/or localizations may be performed using standalone reference lidar devices (i.e., lidar devices not associated with a particular vehicle). For example, a standalone reference lidar device may be mounted adjacent to a parking spot, in a depot, or in a garage. Beneficiary vehicles may use such standalone reference lidar devices to perform calibrations and/or localizations using techniques similar to those described above (with necessary modifications where appropriate, e.g., to account for the fact that the standalone lidar device may have a three-dimensional model different from that of a vehicle).

For example, FIG. 4D is an illustration of a reference lidar device 430 that is part of a standalone unit 440 (e.g., a freestanding unit or a unit mounted to a ceiling, wall, etc.), which may be used to calibrate and/or localize the beneficiary vehicle 500. In some embodiments, the reference lidar device 430 may be used to calibrate the beneficiary vehicle 500 when the beneficiary vehicle 500 is parked in a parking spot 530 (e.g., within a garage), as illustrated. Hence, the standalone unit 440 may be positioned close enough to the parking spot 530 such that the reference lidar device 430 is able to capture point clouds of vehicles parked within the parking spot 530.

The proxy calibration technique used to calibrate and/or localize the beneficiary vehicle using the reference lidar device 430 may be similar to the proxy calibration technique used to calibrate and/or localize the beneficiary vehicle using the reference lidar device 420 illustrated in FIG. 4A. For example, the reference lidar device 430 may capture a first point cloud of the beneficiary vehicle 500 by performing a first lidar scan 432. Additionally, the beneficiary lidar device 520 may capture a second point cloud by performing a second lidar scan 522. The second point cloud may include the standalone unit 440, for example. The first point cloud and the second point cloud may then be transmitted to a computing device (e.g., a computing device of the standalone unit 440, a computing device of the beneficiary vehicle 500, or a remotely located computing device, such as a server). Using the first point cloud and the second point cloud, as well as other data (e.g., a reference localization transform associated with the standalone unit 440; a reference calibration transform associated with the standalone unit 440; and a third point cloud that represents the standalone unit 440, i.e., a "standalone unit-shape point cloud," which may be based on a three-dimensional model of the standalone unit 440; and pose information about the standalone unit), the computing device may calibrate and localize the beneficiary vehicle 500 and/or the beneficiary lidar device 520.

In some embodiments, prior to performing the localization and/or calibration technique, or while performing the localization and/or calibration technique, using the setup of FIG. 4D, the computing device may determine that a confidence level of accurate calibration of the reference lidar device 430 exceeds a calibration confidence threshold and a confidence level of accurate localization of the reference lidar device 430 exceeds a localization confidence threshold. This may ensure that the reference lidar device 430 is sufficiently localized and/or calibrated to use as a baseline for the localization and/or calibration of the beneficiary vehicle 500 and/or the beneficiary lidar device 520.

Figure 5:
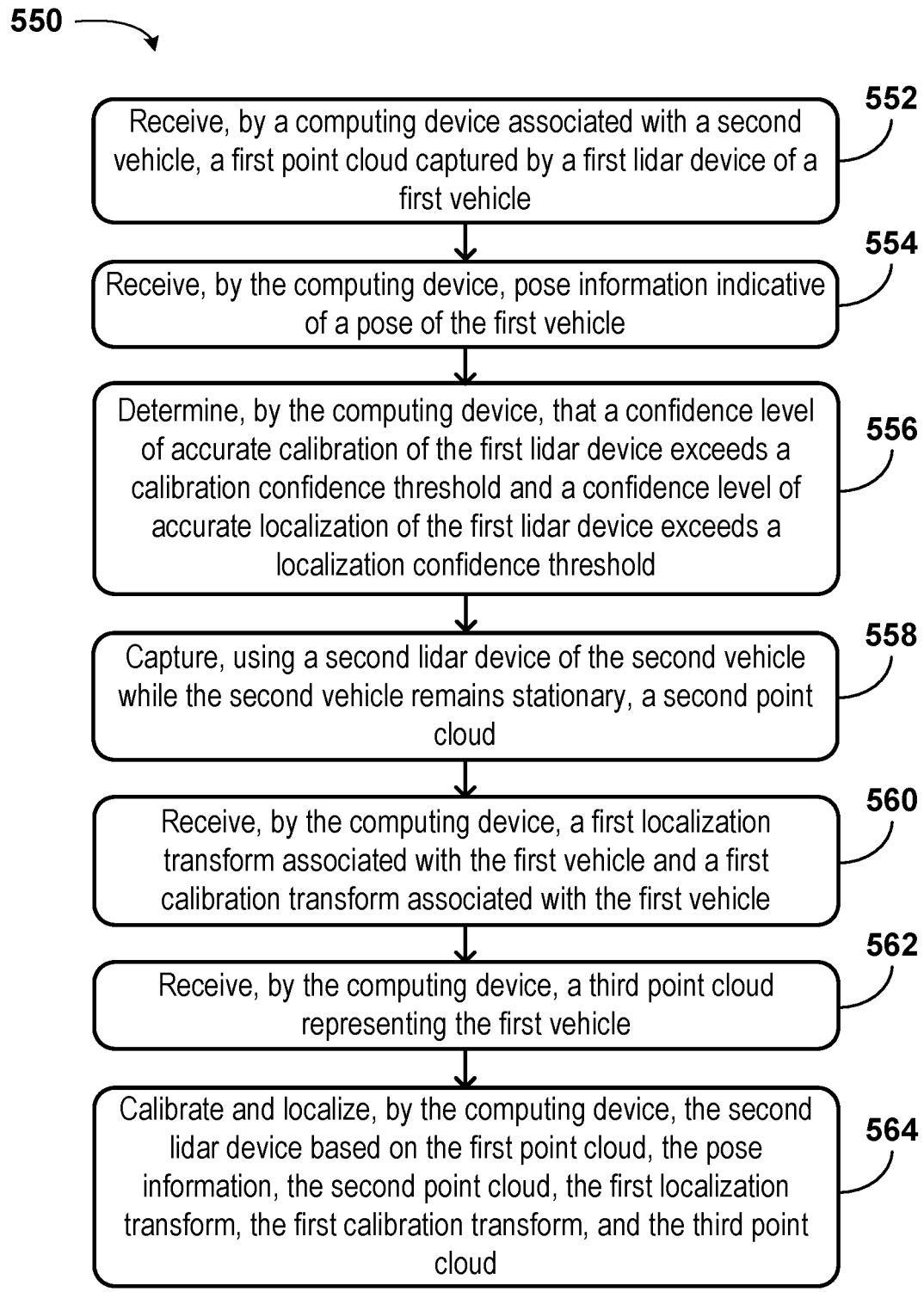
FIG. 5 is an illustration of a method, according to example embodiments.

FIG. 5 is a flowchart diagram of a method 550, according to example embodiments.

At block 552, the method 550 may include receiving, by a computing device associated with a second vehicle, a first point cloud captured by a first lidar device of a first vehicle. The first point cloud may include points representing the second vehicle.

At block 554, the method 550 may include receiving, by the computing device, pose information indicative of a pose of the first vehicle.

At block 556, the method 550 may include determining, by the computing device, that a confidence level of accurate calibration of the first lidar device exceeds a calibration confidence threshold and a confidence level of accurate localization of the first lidar device exceeds a localization confidence threshold.

At block 558, the method 550 may include capturing, using a second lidar device of the second vehicle while the second vehicle remains stationary, a second point cloud.

At block 560, the method 550 may include receiving, by the computing device, a first localization transform associated with the first vehicle and a first calibration transform associated with the first vehicle. The first localization transform is usable to transform between a coordinate system of the first vehicle and a world coordinate system.

At block 562, the method 550 may include receiving, by the computing device, a third point cloud representing the first vehicle.

At block 564, the method 550 may include calibrating and localizing, by the computing device, the second lidar device based on the first point cloud, the pose information, the second point cloud, the first localization transform, the first calibration transform, and the third point cloud.

In some embodiments of the method 550, the first vehicle may remain stationary for a duration of a period over which the first point cloud is captured.

In some embodiments of the method 550, the third point cloud may be generated by sampling a three-dimensional model representing the first vehicle.

In some embodiments of the method 550, a vehicle geometry associated with the second vehicle may be compatible with a vehicle geometry associated with the first vehicle. Generating the third point cloud by sampling the three-dimensional model representing the first vehicle may include sampling, by the computing device, a three-dimensional model of the second vehicle.

In some embodiments of the method 550, the third point cloud may be generated by capturing an auxiliary point cloud using a third lidar device. The auxiliary point cloud may include points representing the first vehicle. Further, the third point cloud may be generated by extracting the third point cloud from the auxiliary point cloud based on the pose information.

In some embodiments of the method 550, calibrating and localizing the second lidar device based on the first point cloud, the pose information, the second point cloud, the first localization transform, the first calibration transform, and the third point cloud may include transforming, by the computing device, the third point cloud into a transformed third point cloud, wherein the transformed third point cloud is represented in the world coordinate system. Calibrating and localizing the second lidar device based on the first point cloud, the pose information, the second point cloud, the first localization transform, the first calibration transform, and the third point cloud may also include determining a location of the second lidar device in the world coordinate system.

In some embodiments of the method 550, determining the location of the second lidar device in the world coordinate system may include determining a vehicle-vehicle transform. The vehicle-vehicle transform may transform points from a coordinate system of the second vehicle to the coordinate system of the first vehicle.

In some embodiments of the method 550, determining the vehicle-vehicle transform may include matching the first point cloud to the second point cloud using a surface matching algorithm.

In some embodiments of the method 550, the surface matching algorithm may include an iterative closest points algorithm.

In some embodiments of the method 550, determining the location of the second lidar device in the world coordinate system may include determining an inverse vehicle-vehicle transform. Further, the inverse vehicle-vehicle transform may transform points from the coordinate system of the first vehicle to a coordinate system of the second vehicle In some embodiment of the method 550, determining the inverse vehicle-vehicle transform may include performing a part-to-whole matching between the transformed third point cloud and a transformed first point cloud. Further, the transformed first point cloud may correspond to the first point cloud transformed into the world coordinate system.

In some embodiments of the method 550, prior to determining the inverse vehicle-vehicle transform, the third point cloud may be cropped to improve results of the part-to-whole matching.

In some embodiments of the method 550, determining the location of the second lidar device in the world coordinate system may include determining a pose of the second lidar device by applying the inverse vehicle-vehicle transform to the pose information In some embodiments of the method 550, localizing the second lidar device may include determining a second localization transform of the second lidar device by applying the inverse vehicle-vehicle transform to the pose information.

In some embodiments of the method 550, calibrating the second lidar device based on the first point cloud, the pose information, the second point cloud, the first calibration transform, and the third point cloud may further include determining a calibration matrix by determining an inverse second localization transform of the second lidar device based on the second localization transform. In addition, calibrating the second lidar device based on the first point cloud, the pose information, the second point cloud, the first calibration transform, and the third point cloud may further include determining a calibration matrix by cascading the inverse second localization transform with the first localization transform, the first calibration transform, and the vehicle-vehicle transform.

In some embodiments, the method 550 may also include receiving, by the computing device, a fourth point cloud and additional pose information. The fourth point cloud may be captured by a fourth lidar device of a fourth vehicle and the additional pose information is indicative of a pose of the fourth vehicle. The fourth point cloud may include points representing the second vehicle. The method 550 may further include determining, by the computing device, that a confidence level of accurate calibration of the fourth lidar device exceeds the calibration confidence threshold and a confidence level of accurate localization of the fourth lidar device exceeds the localization confidence threshold. Still further, the method 550 may include receiving, by the computing device, a fourth localization transform associated with the fourth vehicle and a fourth calibration transform associated with the fourth vehicle. The fourth localization transform may be usable to transform between a coordinate system of the fourth vehicle and the world coordinate system. Even further, the method 550 may include calibrating and localizing, by the computing device, the second lidar device based on the fourth point cloud, the additional pose information, the second point cloud, the fourth localization transform, the fourth calibration transform, and the third point cloud.

In some embodiments of the method 550, calibrating and localizing the second lidar device based on the first point cloud, the pose information, the second point cloud, the first localization transform, the first calibration transform, and the third point cloud may include determining a first preliminary calibration matrix associated with the second lidar device and a first preliminary localization matrix associated with the second lidar device. Further, calibrating and localizing the second lidar device based on the fourth point cloud, the additional pose information, the second point cloud, the fourth localization transform, the fourth calibration transform, and the third point cloud may include determining a second preliminary calibration matrix associated with the second lidar device and a second preliminary localization matrix associated with the second lidar device. The method 550 may also include averaging components of the first preliminary calibration matrix and the second preliminary calibration matrix to arrive at a final calibration matrix of the second lidar device. In addition, the method 550 may further include averaging components of the first preliminary localization matrix and the second preliminary localization matrix to arrive at a final localization matrix of the second lidar device.

In some embodiments, the method 550 may also include receiving, by the computing device, a fourth point cloud and additional pose information. The fourth point cloud may be captured by the first lidar device of the first vehicle at an additional location, wherein the additional location is a different location relative to the second vehicle than a location at which the first point cloud was captured. The additional pose information may be indicative of a pose of the first vehicle at the additional location, and wherein the fourth point cloud includes points representing the second vehicle. The method 550 may further include capturing, using the second lidar device of the second vehicle while the second vehicle remains stationary, a fifth point cloud, wherein the fifth point cloud is captured while the first vehicle is at the additional location. Yet further, the method 550 may include receiving, by the computing device, a fourth localization transform associated with the first vehicle at the additional location. The fourth localization transform may be usable to transform between a coordinate system of the first vehicle at the additional location and the world coordinate system. Additionally, the method 550 may include calibrating and localizing, by the computing device, the second lidar device based on the fourth point cloud, the additional pose information, the fifth point cloud, the fourth localization transform, the first calibration transform, and the third point cloud. Calibrating and localizing the second lidar device based on the first point cloud, the pose information, the second point cloud, the first localization transform, the first calibration transform, and the third point cloud may include determining a first preliminary calibration matrix and a first preliminary localization matrix associated with the second lidar device. Calibrating and localizing the second lidar device based on the fourth point cloud, the additional pose information, the fifth point cloud, the fourth localization transform, the first calibration transform, and the third point cloud may include determining a second preliminary calibration matrix and a second preliminary localization matrix associated with the second lidar device. Still yet further, the method 550 may include averaging components of the first preliminary calibration matrix and the second preliminary calibration matrix to arrive at a final calibration matrix of the second lidar device. Even still yet further, the method 550 may include averaging components of the first preliminary localization matrix and the second preliminary localization matrix to arrive at a final localization matrix of the second lidar device.

Figure 6:
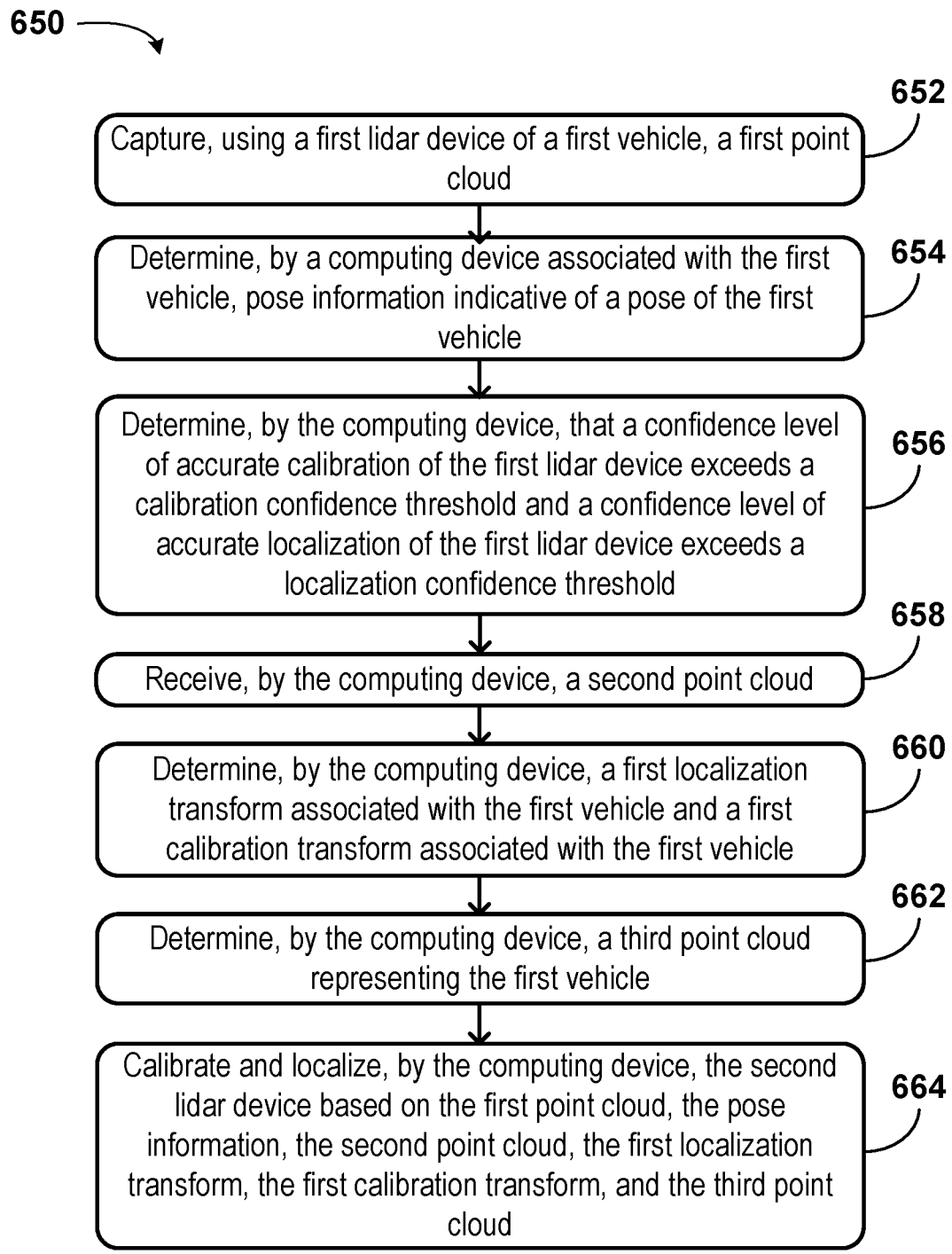
FIG. 6 is an illustration of a method, according to example embodiments.

FIG. 6 is a flowchart diagram of a method 650, according to example embodiments.

At block 652, the method 650 may include capturing, using a first lidar device of a first vehicle, a first point cloud. The first point cloud may include points representing a second vehicle.

At block 654, the method 650 may include determining, by a computing device associated with the first vehicle, pose information indicative of a pose of the first vehicle.

At block 656, the method 650 may include determining, by the computing device, that a confidence level of accurate calibration of the first lidar device exceeds a calibration confidence threshold and a confidence level of accurate localization of the first lidar device exceeds a localization confidence threshold.

At block 658, the method 650 may include receiving, by the computing device, a second point cloud, wherein the second point cloud is captured by a second lidar device of the second vehicle while the second vehicle remains stationary.

At block 660, the method 650 may include determining, by the computing device, a first localization transform associated with the first vehicle and a first calibration transform associated with the first vehicle. The first localization transform may be usable to transform between a coordinate system of the first vehicle and a world coordinate system.

At block 662, the method 650 may include determining, by the computing device, a third point cloud representing the first vehicle.

At block 664, the method 650 may include calibrating and localizing, by the computing device, the second lidar device based on the first point cloud, the pose information, the second point cloud, the first localization transform, the first calibration transform, and the third point cloud.

Figure 7:
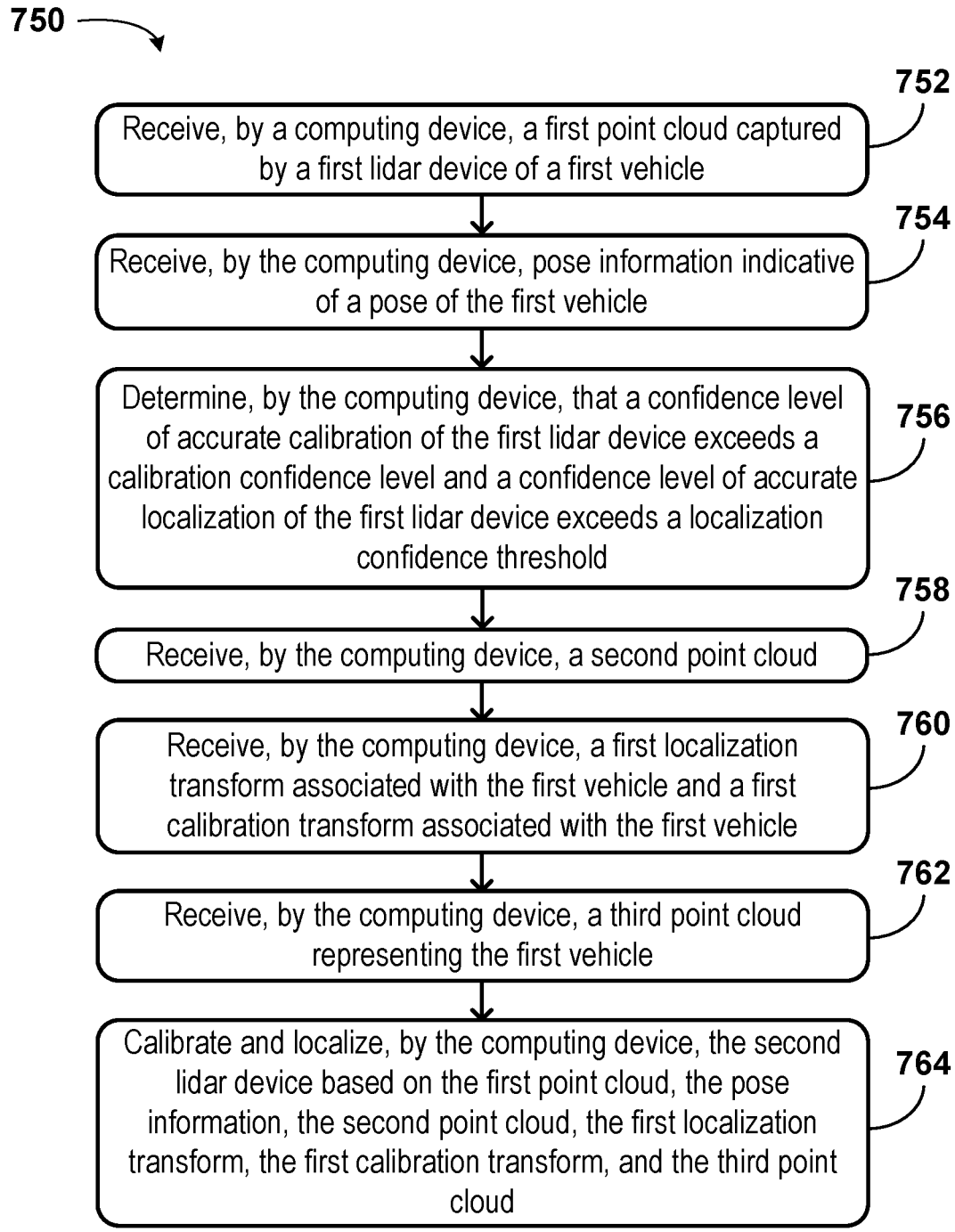
FIG. 7 is an illustration of a method, according to example embodiments.

FIG. 7 is a flowchart diagram of a method 750, according to example embodiments.

At block 752, the method 750 may include receiving, by a computing device, a first point cloud captured by a first lidar device of a first vehicle. The first point cloud may include points representing a second vehicle. The computing device may be located remotely from the first vehicle and the second vehicle.

At block 754, the method 750 may include receiving, by the computing device, pose information indicative of a pose of the first vehicle.

At block 756, the method 750 may include determining, by the computing device, that a confidence level of accurate calibration of the first lidar device exceeds a calibration confidence level and a confidence level of accurate localization of the first lidar device exceeds a localization confidence threshold.

At block 758, the method 750 may include receiving, by the computing device, a second point cloud. The second point cloud may be captured by a second lidar device of the second vehicle while the second vehicle remains stationary.

At block 760, the method 750 may include receiving, by the computing device, a first localization transform associated with the first vehicle and a first calibration transform associated with the first vehicle. The first localization transform may be usable to transform between a coordinate system of the first vehicle and a world coordinate system.

At block 762, the method 750 may include receiving, by the computing device, a third point cloud representing the first vehicle.

At block 764, the method 750 may include calibrating and localizing, by the computing device, the second lidar device based on the first point cloud, the pose information, the second point cloud, the first localization transform, the first calibration transform, and the third point cloud.

III. Conclusion

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block, operation, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step, block, or operation that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer-readable medium such as a storage device including random-access memory (RAM), a disk drive, a solid state drive, or another storage medium.

Moreover, a step, block, or operation that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
   receiving, by a computing device associated with a second vehicle, a first point cloud captured by a first light detection and ranging (lidar) device of a first vehicle, wherein the first point cloud includes points representing the second vehicle;
   receiving, by the computing device, pose information indicative of a pose of the first vehicle;
   determining, by the computing device, that a confidence level of accurate calibration of the first lidar device exceeds a calibration confidence threshold and a confidence level of accurate localization of the first lidar device exceeds a localization confidence threshold;
   capturing, using a second lidar device of the second vehicle while the second vehicle remains stationary, a second point cloud;
   receiving, by the computing device, a first localization transform associated with the first vehicle and a first calibration transform associated with the first vehicle, wherein the first localization transform is usable to transform between a coordinate system of the first vehicle and a world coordinate system;
   receiving, by the computing device, a third point cloud representing the first vehicle; and
   calibrating and localizing, by the computing device, the second lidar device based on the first point cloud, the pose information, the second point cloud, the first localization transform, the first calibration transform, and the third point cloud.

2. The method of claim 1, wherein the first vehicle remains stationary for a duration of a period over which the first point cloud is captured.

3. The method of claim 1, wherein the third point cloud is generated by sampling a three-dimensional model representing the first vehicle.

4. The method of claim 3, wherein a vehicle geometry associated with the second vehicle is compatible with a vehicle geometry associated with the first vehicle, wherein generating the third point cloud by sampling the three-dimensional model representing the first vehicle comprises sampling, by the computing device, a three-dimensional model of the second vehicle.

5. The method of claim 1, wherein the third point cloud is generated by:
   capturing an auxiliary point cloud using a third lidar device, wherein the auxiliary point cloud includes points representing the first vehicle; and
   extracting the third point cloud from the auxiliary point cloud based on the pose information.

6. The method of claim 1, wherein calibrating and localizing the second lidar device based on the first point cloud, the pose information, the second point cloud, the first localization transform, the first calibration transform, and the third point cloud comprises:
   transforming, by the computing device, the third point cloud into a transformed third point cloud, wherein the transformed third point cloud is represented in the world coordinate system; and
   determining a location of the second lidar device in the world coordinate system.

7. The method of claim 6, wherein determining the location of the second lidar device in the world coordinate system comprises determining a vehicle-vehicle transform, wherein the vehicle-vehicle transform transforms points from a coordinate system of the second vehicle to the coordinate system of the first vehicle.

8. The method of claim 7, wherein determining the vehicle-vehicle transform comprises matching the first point cloud to the second point cloud using a surface matching algorithm.

9. The method of claim 8, wherein the surface matching algorithm comprises an iterative closest points algorithm.

10. The method of claim 7, wherein determining the location of the second lidar device in the world coordinate system comprises determining an inverse vehicle-vehicle transform, and wherein the inverse vehicle-vehicle transform transforms points from the coordinate system of the first vehicle to a coordinate system of the second vehicle.

11. The method of claim 10, wherein determining the inverse vehicle-vehicle transform comprises performing a part-to-whole matching between the transformed third point cloud and a transformed first point cloud, and wherein the transformed first point cloud corresponds to the first point cloud transformed into the world coordinate system.

12. The method of claim 11, wherein, prior to determining the inverse vehicle-vehicle transform, the third point cloud is cropped to improve results of the part-to-whole matching.

13. The method of claim 10, wherein determining the location of the second lidar device in the world coordinate system comprises determining a pose of the second lidar device by applying the inverse vehicle-vehicle transform to the pose information.

14. The method of claim 10, wherein localizing the second lidar device comprises determining a second localization transform of the second lidar device by applying the inverse vehicle-vehicle transform to the pose information.

33

15. The method of claim 14, wherein calibrating the second lidar device based on the first point cloud, the pose information, the second point cloud, the first calibration transform, and the third point cloud further comprises determining a calibration matrix by:
  determining an inverse second localization transform of the second lidar device based on the second localization transform; and
  cascading the inverse second localization transform with the first localization transform, the first calibration transform, and the vehicle-vehicle transform.

16. The method of claim 1, further comprising:
  receiving, by the computing device, a fourth point cloud and additional pose information, wherein the fourth point cloud is captured by a fourth lidar device of a fourth vehicle and the additional pose information is indicative of a pose of the fourth vehicle, and wherein the fourth point cloud includes points representing the second vehicle;
  determining, by the computing device, that a confidence level of accurate calibration of the fourth lidar device exceeds the calibration confidence threshold and a confidence level of accurate localization of the fourth lidar device exceeds the localization confidence threshold;
  receiving, by the computing device, a fourth localization transform associated with the fourth vehicle and a fourth calibration transform associated with the fourth vehicle, wherein the fourth localization transform is usable to transform between a coordinate system of the fourth vehicle and the world coordinate system; and
  calibrating and localizing, by the computing device, the second lidar device based on the fourth point cloud, the additional pose information, the second point cloud, the fourth localization transform, the fourth calibration transform, and the third point cloud.

17. The method of claim 16,
  wherein calibrating and localizing the second lidar device based on the first point cloud, the pose information, the second point cloud, the first localization transform, the first calibration transform, and the third point cloud comprises determining a first preliminary calibration matrix associated with the second lidar device and a first preliminary localization matrix associated with the second lidar device,
  wherein calibrating and localizing the second lidar device based on the fourth point cloud, the additional pose information, the second point cloud, the fourth localization transform, the fourth calibration transform, and the third point cloud comprises determining a second preliminary calibration matrix associated with the second lidar device and a second preliminary localization matrix associated with the second lidar device, and
  wherein the method further comprises:
    averaging components of the first preliminary calibration matrix and the second preliminary calibration matrix to arrive at a final calibration matrix of the second lidar device; and
    averaging components of the first preliminary localization matrix and the second preliminary localization matrix to arrive at a final localization matrix of the second lidar device.

18. The method of claim 1, further comprising:
  receiving, by the computing device, a fourth point cloud and additional pose information, wherein the fourth point cloud is captured by the first lidar device of the first vehicle at an additional location, wherein the

34 additional location is a different location relative to the second vehicle than a location at which the first point cloud was captured, wherein the additional pose information is indicative of a pose of the first vehicle at the additional location, and wherein the fourth point cloud includes points representing the second vehicle;
  capturing, using the second lidar device of the second vehicle while the second vehicle remains stationary, a fifth point cloud, wherein the fifth point cloud is captured while the first vehicle is at the additional location;
  receiving, by the computing device, a fourth localization transform associated with the first vehicle at the additional location, wherein the fourth localization transform is usable to transform between a coordinate system of the first vehicle at the additional location and the world coordinate system;
  calibrating and localizing, by the computing device, the second lidar device based on the fourth point cloud, the additional pose information, the fifth point cloud, the fourth localization transform, the first calibration transform, and the third point cloud,
  wherein calibrating and localizing the second lidar device based on the first point cloud, the pose information, the second point cloud, the first localization transform, the first calibration transform, and the third point cloud comprises determining a first preliminary calibration matrix and a first preliminary localization matrix associated with the second lidar device,
  wherein calibrating and localizing the second lidar device based on the fourth point cloud, the additional pose information, the fifth point cloud, the fourth localization transform, the first calibration transform, and the third point cloud comprises determining a second preliminary calibration matrix and a second preliminary localization matrix associated with the second lidar device;
  averaging components of the first preliminary calibration matrix and the second preliminary calibration matrix to arrive at a final calibration matrix of the second lidar device; and
  averaging components of the first preliminary localization matrix and the second preliminary localization matrix to arrive at a final localization matrix of the second lidar device.

19. A method comprising:
  capturing, using a first light detection and ranging (lidar) device of a first vehicle, a first point cloud, wherein the first point cloud includes points representing a second vehicle;
  determining, by a computing device associated with the first vehicle, pose information indicative of a pose of the first vehicle;
  determining, by the computing device, that a confidence level of accurate calibration of the first lidar device exceeds a calibration confidence threshold and a confidence level of accurate localization of the first lidar device exceeds a localization confidence threshold;
  receiving, by the computing device, a second point cloud, wherein the second point cloud is captured by a second lidar device of the second vehicle while the second vehicle remains stationary;
  determining, by the computing device, a first localization transform associated with the first vehicle and a first calibration transform associated with the first vehicle, wherein the first localization transform is usable to transform between a coordinate system of the first vehicle and a world coordinate system;

determining, by the computing device, a third point cloud representing the first vehicle; and calibrating and localizing, by the computing device, the second lidar device based on the first point cloud, the pose information, the second point cloud, the first localization transform, the first calibration transform, and the third point cloud.

20. A method comprising:

receiving, by a computing device, a first point cloud captured by a first light detection and ranging (lidar) device of a first vehicle, wherein the first point cloud includes points representing a second vehicle, and wherein the computing device is located remotely from the first vehicle and the second vehicle;

receiving, by the computing device, pose information indicative of a pose of the first vehicle;

determining, by the computing device, that a confidence level of accurate calibration of the first lidar device exceeds a calibration confidence level and a confidence level of accurate localization of the first lidar device exceeds a localization confidence threshold;

receiving, by the computing device, a second point cloud, wherein the second point cloud is captured by a second lidar device of the second vehicle while the second vehicle remains stationary;

receiving, by the computing device, a first localization transform associated with the first vehicle and a first calibration transform associated with the first vehicle, wherein the first localization transform is usable to transform between a coordinate system of the first vehicle and a world coordinate system;

receiving, by the computing device, a third point cloud representing the first vehicle; and calibrating and localizing, by the computing device, the second lidar device based on the first point cloud, the pose information, the second point cloud, the first localization transform, the first calibration transform, and the third point cloud.

* * * * *